(12) United States Patent
Novak et al.

(10) Patent No.: US 11,689,025 B2
(45) Date of Patent: Jun. 27, 2023

(54) MOBILE AUTONOMOUS SOLAR-WIND ELECTRICAL STATION

(71) Applicant: PATRIOT-NRG, LLC, Kyiv (UA)

(72) Inventors: Eugene Novak, Kyiv (UA); Ihor Vovchuk, Lviv (UA); Boris Pleskach, Kyiv (UA); Volodymyr Smolin, Dnipro (UA); Maksim Chuprina, Kyiv (UA); Liubov Potapenko, Kropyvnytsky (UA)

(73) Assignee: PATRIOT-NRG, LLC, Kyiv (UA)

( * ) Notice: Subject to any disclaimer, the term of this patent is extended or adjusted under 35 U.S.C. 154(b) by 0 days.

(21) Appl. No.: 17/623,552

(22) PCT Filed: Jun. 18, 2020

(86) PCT No.: PCT/UA2020/000061
§ 371 (c)(1),
(2) Date: Dec. 28, 2021

(87) PCT Pub. No.: WO2021/246993
PCT Pub. Date: Dec. 9, 2021

(65) Prior Publication Data
US 2023/0105424 A1    Apr. 6, 2023

(30) Foreign Application Priority Data
Jun. 5, 2020 (UA) .................. a 2020 03437

(51) Int. Cl.
*H02J 3/38* (2006.01)
*F03D 9/00* (2016.01)
(Continued)

(52) U.S. Cl.
CPC .............. *H02J 3/381* (2013.01); *B60L 53/30* (2019.02); *B60L 53/51* (2019.02); *B60L 53/52* (2019.02);
(Continued)

(58) Field of Classification Search
CPC .......... H02J 3/38; H02J 3/391; H02J 2300/28; H02J 2300/24; B60L 53/51; B60L 53/52;
(Continued)

(56) References Cited

FOREIGN PATENT DOCUMENTS

CA         2610507 A1 *  5/2008

* cited by examiner

*Primary Examiner* — Robert L Deberadinis
(74) *Attorney, Agent, or Firm* — White-Welker & Welker, LLC; Matthew T. Welker, Esq.

(57) ABSTRACT

A Mobile Autonomous Solar-Wind Electrical Station (MAS-WES) comprises an offshore container (2), which equipped with a reinforced case (18); a reinforced grillage (19) provided by at least two beams laid along, and plurality beams laid across the container (2); at least two reinforced internal columns (42) arranged in opposite corners of the container (2) and between the grillage (19) and the middle part of the reinforced case (18); a plurality of light reflecting mats (21); a plurality of movable screw-piles (22), which in the transport position are stored in the plurality of cylindrical channels (38); at least two monolithic towers or telescopic masts (52) of powerful horizontal-axis wind turbines (23) providing at least 10 kW power each with blades and wind vanes taken off in the transport position. The reinforced internal columns (42) are the bases for the monolithic towers or the telescopic masts (52) and equipped with a hydraulic mechanism or an electric actuator (54) and an erection tool for installation of mentioned monolithic towers or telescopic masts (52). The container (2) comprises gondolas, which in the transport position are arranged horizontally in opposite ends of the container (2); a plurality of photovoltaic double-sided panels (24); a plurality of multifold frameworks for photovoltaic panel arrays (25) with at least 30 kW power total and at least one charging point (28) stored inside the container and at least one rechargeable battery (31).

20 Claims, 27 Drawing Sheets

(51) Int. Cl.

| | |
|---|---|
| *E04H 12/18* | (2006.01) |
| *E02D 27/42* | (2006.01) |
| *E04H 1/12* | (2006.01) |
| *E04H 5/02* | (2006.01) |
| *E02D 5/56* | (2006.01) |
| *B60L 53/52* | (2019.01) |
| *B60L 53/51* | (2019.01) |
| *B60L 53/30* | (2019.01) |
| *F03D 13/20* | (2016.01) |

(52) U.S. Cl.
CPC ............ *E02D 5/56* (2013.01); *E02D 27/425* (2013.01); *E04H 1/12* (2013.01); *E04H 5/02* (2013.01); *E04H 12/182* (2013.01); *F03D 9/007* (2013.01); *F03D 13/20* (2016.05); *E04H 2001/1283* (2013.01); *F05B 2220/708* (2013.01); *H02J 2300/24* (2020.01); *H02J 2300/28* (2020.01)

(58) Field of Classification Search
CPC ......... B60L 53/30; E02D 5/56; E02D 27/425; E02D 27/42; E04H 1/12; E04H 5/02; E04H 12/182; E04H 2001/1283; E04H 12/18; F03D 9/007; F03D 13/20; F03D 9/00; F05B 2220/708
See application file for complete search history.

39

MOBILE AUTONOMOUS SOLAR-WIND ELECTRICAL STATION

SEQUENCE LISTING OR PROGRAM

Not Applicable

FIELD OF THE INVENTION

The present invention relates to the energy industry and electricity. More specifically the present invention relates to mobile autonomous photovoltaic and wind power plants for a wide range of electric consumers based on an intermodal shipping container that is transportable by sea, road, railway, and air and can be easily moved from one place to another an unlimited number of times.

BACKGROUND OF THE INVENTION

The leading and largest countries in the world according to public sources for different years had the following number of gasoline-diesel filling stations: United Kingdom 8,422 units for 2017, USA 114,474 for 2012, Canada 12,684 for 2008, Japan 40,357 for 2009, Germany 14,300 for 2011, China 95,000 for 2009, India 60,799 for 2017, Argentina 3,916 for 2014. The total number of these countries is about 350,000 gasoline-diesel stations. The worldwide number can be estimated at 450,000 such stations for internal combustion engines.

Global demand for small green power plants is estimated at millions, perhaps tens of millions of units. Under pressure from the international community, all sectors of the economy are being forced to gradually move to cleaner and greener energy sources, which will continue to create and amplify the desire for both diverse electric transport, machines, and its infrastructure.

Surveys of individual EU citizens and other developed western countries about the reasons for the ongoing slow transition to electric transport reveal the following: still a high price for electric cars, a categorical lack of charging stations.

Electric car manufacturers also consider the lack of stations as the main reason for the slowdown in development and the inability to produce their products in large batches. It is obvious that facilitating access to the charging of electric transport, reducing the distance between stations will revive the demand for electric vehicles, which in turn will lead to a decrease in their price. At the same time, the cost of such electrical infrastructure is a cornerstone.

Therefore, what is needed is a Mobile Autonomous Solar-Wind Electrical Station (hereinafter referred to as the MASWES) as taught by the present invention that will allow the following: ensure 100% clean energy production for environmental protection; minimize the cost of energy from the sun and wind (only depreciation, service); use in remote areas and anywhere thanks to autonomy; enable the cheap movement of stations to the place of demand (mobility); lower cost production of stations in industrial conditions than their construction on a building site; provide a reduction of running costs due to remote control and maintenance, enable various forms of use: energy consumption, rent, sharing, property, resale, etc, with simple and low-cost transportation by sea, land, air in a modular production.

It is possible to provide simultaneous charging from the MASWES to at least six electric vehicles for the MASWES based on 40 ft container, by three different international connectors, albeit not limited to: SAE CCS, Type 2, CHAdeMO, which means a fast charging process. The approximate number of electric cars charged with 22 kWh batteries capacity per day is at least 12-19 for South and Middle Europe depending on the weather conditions that day.

Based on the universality of the present invention, this device can be distributed in the following ways: purchase of the station for the full price of the order for private use; purchase of the station under leasing and similar arrangements; temporary rental of the station for periodic payments; purchase of stations in large lots to create a private network; and establishment by the manufacturer of its own large network of stations across a country and a union.

Minimizing the cost, efficiency, and reliability of the MASWES will make the stations rank first in the world in the number of units installed.

Current prior art devices suffer from many shortcomings. Many similar devices cannot be connected to a power grid in the case of shortage of solar radiation and/or wind power even if on-grid facilities exist on that territory.

Many of the prior art devices are actually insufficient in structure and capacity to meet the current market needs. Many are under powered due to a lack of mast size or photovoltaic modules for power generation and are incapable of charging more powerful electric devices and consumers like households, electric vehicles, electric tractors, etc.

Other portable, self-sustaining power stations include an internal combustion engine and a fuel tank, which are not based on exclusively renewable sources. Others have two or more types of power generating devices connected to each other where the first type of power generating device is different than the second type of power generating device which may provide easy access to different types of power outputs, but still often teach the use of an internal combustion engine and a fuel tank, making them nothing more than a generator with a additional wind or solar component for the purposes of appearing "green" to consumers.

Many of the prior art devices teach undersized photovoltaic or wind components that result in power generation under 5 kW. Additionally, those with masts are often equipped with complex and expensive structures, such as crane arms, for deployment of the masts and the container or structure is typically insufficiently secured to the ground for high wind conditions, which will often or likely results in damage to the masts or entire device and structure since they do not provide enough support for the use of powerful wind turbines.

Many prior art devices teach transportable, deployable utility systems comprising of a housing, solar panels, wind turbine(s), fuel cells, fuel reformers, and other energy sources placed in and mounted on the housing or nearby. Such devices also teach the use of a photovoltaic solar panel array that is mounted on the housing for movement between a retracted, storage position and an extended, use position. The prior art devices are and the structure used and taught by them is complex, expensive, and often ineffective.

SUMMARY OF THE INVENTION

The present invention relates to containers, packaging elements or packages specially adapted for particular articles or materials; generation of electrical power by conversion of infra-red radiation, visible light or ultraviolet light, using photovoltaic modules; adaptations of wind motors for special use, combinations of wind motors with apparatus driven thereby; wind motors specially adapted for installation in particular locations.

A mobile stand-alone photovoltaic-wind power plant (an electrical station) is based at most on one 20 ft, 40 ft or 45 ft offshore container with a reinforced grillage and a hull comprising three parts (levels): (1—the lowest part) the ground blocks, light reflecting mats and movable screw-pile foundation part; (2—the middle part) the electrical and another equipment waterproof part; (3—the highest part) the powerful wind turbines and multi-time folded photovoltaic modules array part.

The stability of the station's position is achieved first of all by the propulsion of screw-piles into the soil (natural or previously prepared) by a rotary hydraulic power head or an electric motor with planetary gearbox (or a worm geared motor), which also puts the piles back before the next transportation.

At least two monolith towers or telescopic masts of the powerful on-shore wind power plant with blades and wind vanes folded or taken off, turned gondolas are oppositely mounted along with the container in the stowed position, which are lifted in series by the hydraulic mechanism (or the electric actuator) and fixed by ropes to the ground and the housing of the container for expansion if it is needed.

The accumulation and delivery of electricity are carried out by rechargeable batteries, which are also involved in the installation and dismantling of the station, with inverters.

To maintain a constant temperature in the station, a reversible (heat-cold) heat pump might be used, the refrigerant of which enters the channels go deep into the soil piles, or an air conditioner might be used instead of or additionally.

The necessary supply or disposal of working fluids and materials may be provided by drones through roof openings in the service area.

The station has a control and communication module; weather, temperature, fluctuation, safety, and other sensors; equipped with a lightning protection device, fire alarms, fire extinguishers, and video surveillance.

The station is equipped with at least one anti-vandal charging point (a charging substation) for, albeit not limited to, households, electric vehicles, tractors, bicycles, skates, scooters, segways or others and any direct current/alternating current electric equipment with standard connectors and/or groups of outlets, terminals for receiving non-cash payments as an option.

The installation can be connected to the power supply network, either an on-grid or off-grid power station depending on the situation and territory's facility.

BRIEF DESCRIPTION OF FIGURES

The accompanying drawings, which are incorporated herein form a part of the specification, illustrate the present invention and, together with the description, further serve to explain the principles of the invention and to enable a person skilled in the pertinent art to make and use the invention.

DETAILED DESCRIPTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
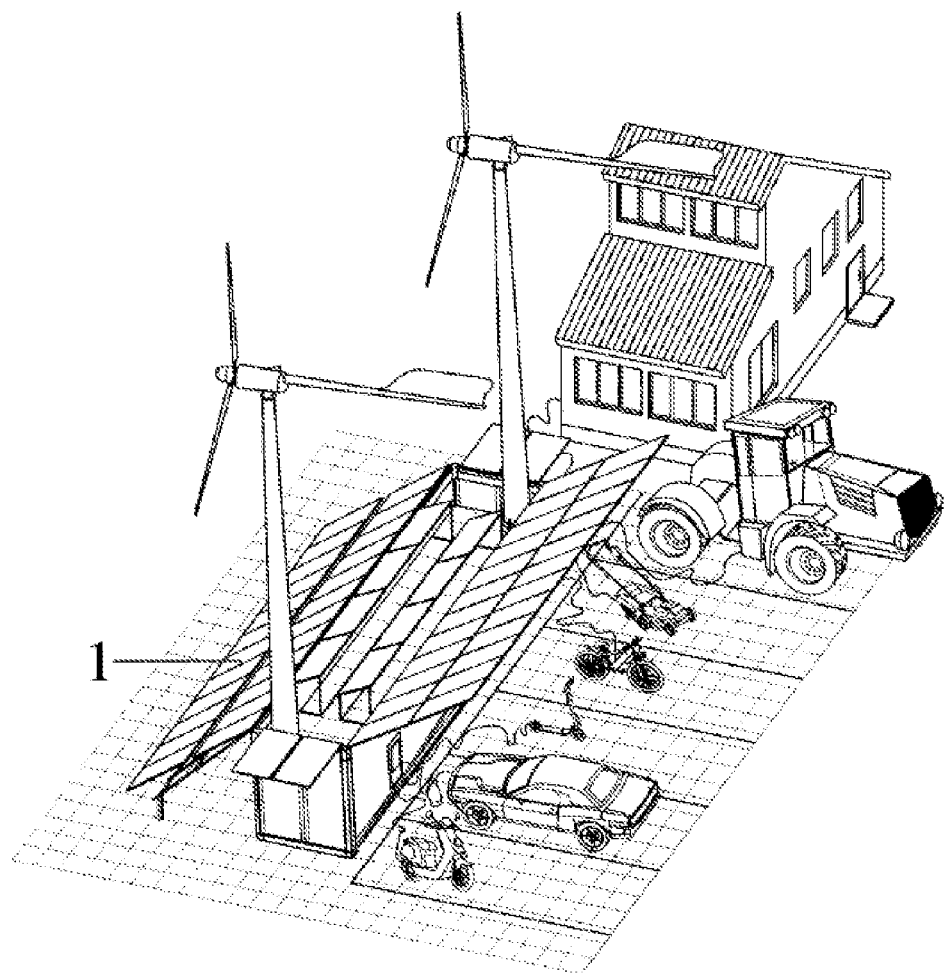
FIG. 1 is a perspective view of the MASWES, next fields covered by light reflecting mats and examples of different consumers.

As shown in FIG. 1 the mobile stand-alone photovoltaic-wind power plant—the MASWES (1) is based at most on one easy mounted 20 ft, 40 ft or 45 ft standard offshore container (ISO) and it is used for charging different electric consumers, albeit not limited to electric vehicles for various purposes (cars, scooters, bicycles, etc.), as well as households, farms, agriculture (for example, electric tractors, drones, other unmanned aerial and land vehicles), and military.

Figure 2:
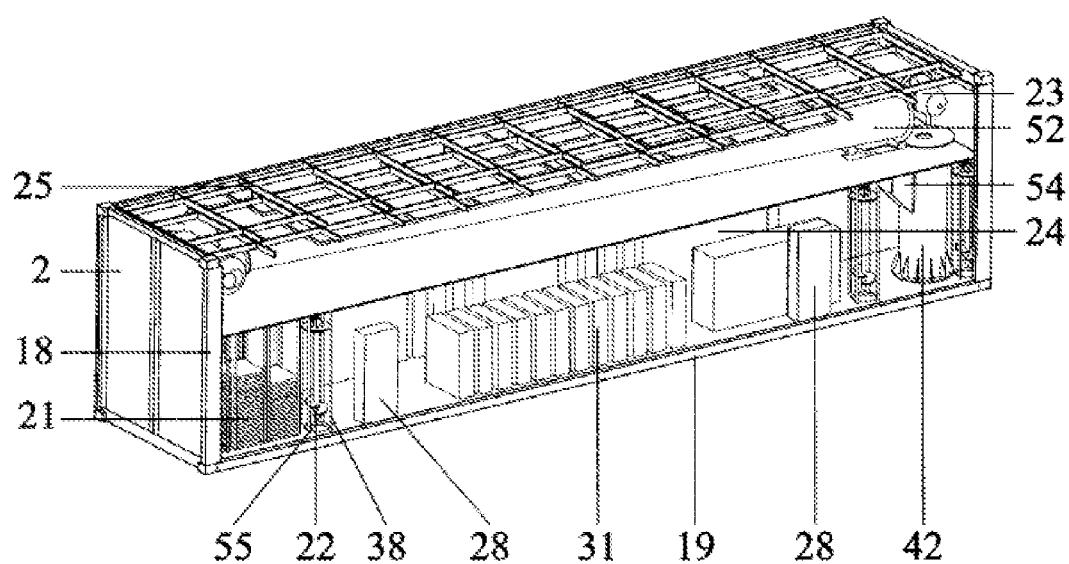
FIG. 2 is a general scheme of situating all the MASWES' equipment at the transport phase.

Referring to FIG. 2 the Mobile Autonomous Solar-Wind Electrical Station (MASWES) does not have any protruding parts at the transport phase and consists of all equipment needed, albeit not limited to a 40 ft offshore container (2), as an example, with the reinforced hull (18) and the reinforced grillage (19), the light reflecting mats (21) stored, the movable screw-piles (22) in the cylindrical channels (38), wherein the container has the hatch (55) for screw pile movement, at least two monolith towers (52) or telescopic masts of powerful horizontal-axis wind turbines (23) providing at least 10 kW power each and at least 14 m height each for 40 ft container, at least 20 kW power total, with blades and wind vanes taken off, turned gondolas are horizontally oppositely mounted along with the container in the stowed position, photovoltaic two sided panels (24) stored, multi-time folded photovoltaic module arrays (25) providing at least 30 kW power total, the charging points (28) are stored inside, rechargeable batteries (31), the reinforced internal columns (42) with a hydraulic mechanism (or an electric actuator) (54) as the foundation and an erection tool accordingly for monolith towers (telescopic masts).

Figure 5:
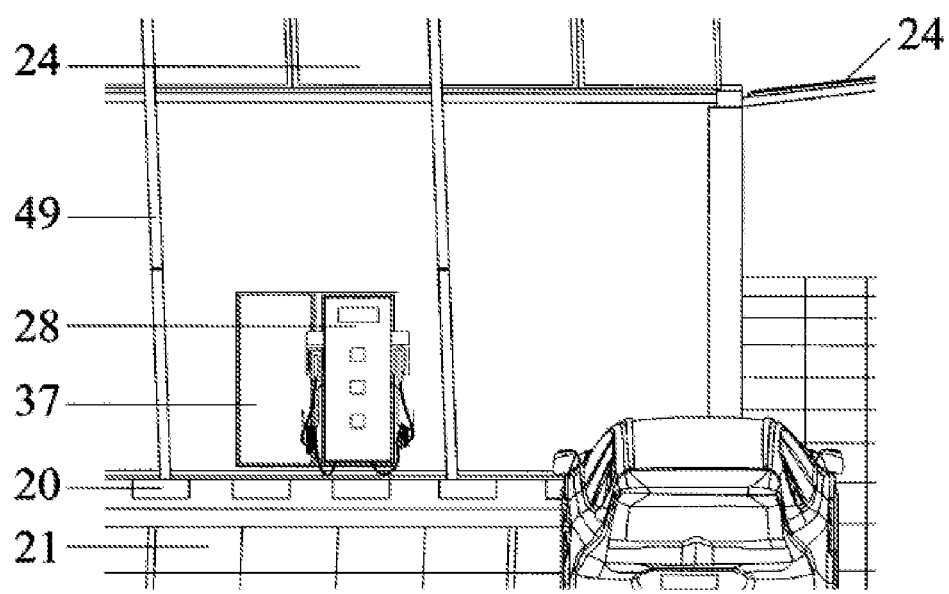
FIG. 5 is the customer side of the MASWES including a charging substation in use.

FIG. 5 shows the client front side of the MASWES wherein the light reflecting mats (21) under and next to the MASWES with photovoltaic two sided panels (24) together allow receiving significantly more energy from solar radiation than it is know from prior arts. The high story of arrays is supported by several multi-section bars (49) with/without leveling jacks between arrays and the lowest container edge for arrays angle correcting by at least 0-30 degrees. The MASWES is situated on the ground blocks (20), which protect the station from rainwater and melted snow. The client front side has at least one charging point or charging substation (28) is moved out by a couple of inches through the sliding door (37) at the work phase having typical outlets (connectors), albeit not limited to SAE CCS, Type 2, CHAdeMO, etc.

Figure 11:
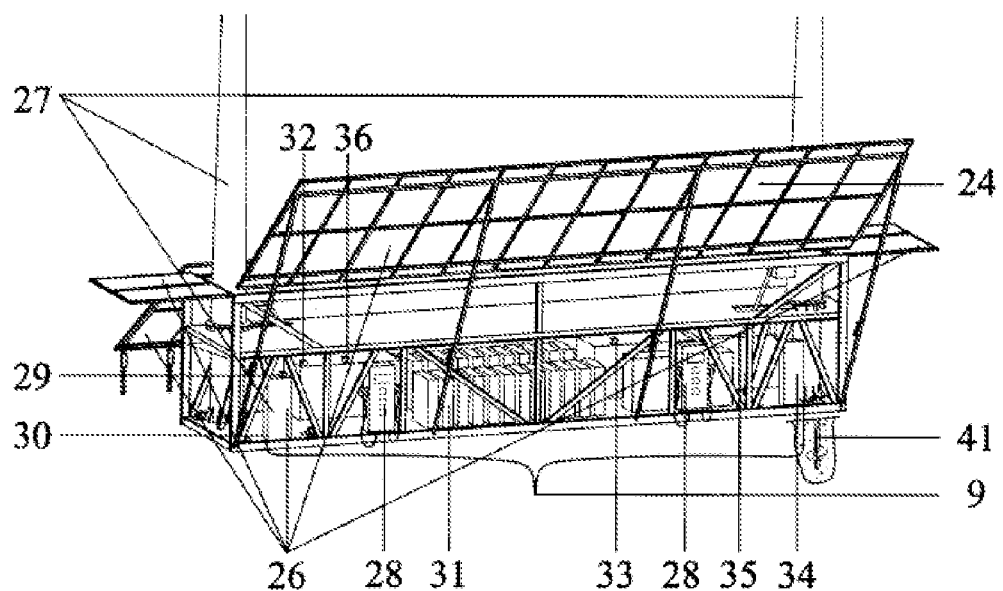
FIG. 11 is the internal view of the MASWES showing the electrical power system.

According to FIG. 11 the electrical power system (9) of the Mobile Autonomous Solar-Wind Electrical Station (MASWES) consists of, albeit not limited to a photovoltaic two sided panels power plant (26), a powerful wind energy power plant (27), at least one charging point or charging substation (28), a load breaker with a fuse (29), a hybrid inverter (30), a rechargeable battery (31), an off-grid controller (32), an on-grid controller (33), a heat pump (34) with the refrigerant (41), a conditioner (35), an own needs inverter (36) for internal equipment such as an air conditioner, one or more counters for tracking the amount of energy provided from the MASWES an energy grid, which acting as a supplier to the energy grid, at least two powerful wind turbines (23), at least 120 m2 of photovoltaic two sided panels (24) for a 40 ft offshore container which is four times more than the container's square.

The Mobile Autonomous Solar-Wind Electrical Station (MASWES) is transported from a place of delivering to the final area of mounting by a container truck with a tilt bed or side loader (the truck and a crane). Before the final loading onto the container truck, screw-pile hatches (55) need to be slid (FIG. 12) and the MASWES is carried to the place of mounting with opened screw-pile hatches. The MASWES is mostly installed on a hill with natural middle hardness soil (for example, sand, clay or loam) or a previously prepared sand cushion for screw-pile movement. Nonetheless, the absolutely horizontal surface up to the container's square and transport ways for customers have to be prepared. The client front side of the MASWES is needed to be directly oriented to the north for the northern hemisphere and to the south for the southern hemisphere.

Ground blocks (20) must be laid onto the horizontal surface before sliding the MASWES using the tilt bed truck, the further horizontal situation of the MASWES is achieved by internal piles screwing. In case of difficulties with the horizontal surface of soil preparation the MASWES may be put onto at least six previously screwed external powerful piles or other type of foundation, moreover, internal screw-piles (22) help to press the MASWES to the ground and to stabilize the station's position. For that unloading achievement, only a side loader truck (the truck and a crane) may be used.

Sufficiently recessed screw-piles (22) are additionally used as carriers of low-potential heat-cold in the heat pump system (34) to heat or to cool the station depending on the season and the current temperature conditions. The simpler solution is to apply an air conditioner (35) that automatically switches on when the temperature is too high or too low than it is provided by the operating conditions of the individual equipment or the station as a whole.

Figure 3:
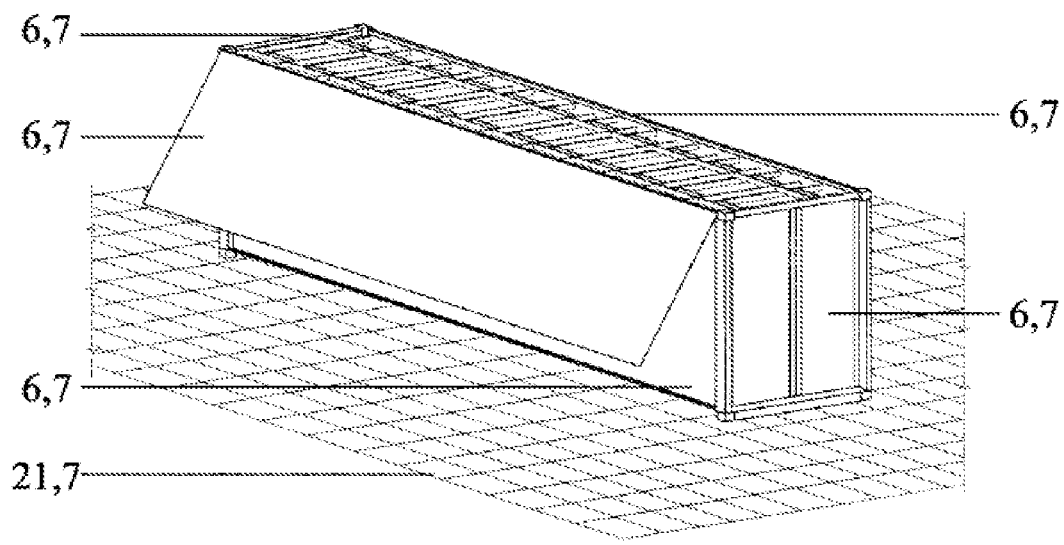
FIG. 3 is a 40 ft standard High Cube ISO container, whose surfaces are covered by the light reflecting material and light reflecting mats are laid nearby.

As seen in FIG. 3 the mats (21) laying around the station on land and the certain surfaces (6) of said container are covered by the light reflecting material (7) that altogether allow retracting sunlight and directing it into the reverse surface of photovoltaic two sided panels despite specific hours of daytime and a season of the year. Additionally light reflecting mats (21) prevent the ground from being destroyed during different electric vehicles' and tractors' traffic for charging from the station. If it is needed the container's roof taken off covered by light reflecting material might be used as an addition to the light reflecting mats. The container's roof is multi-sectional.

Figure 14:
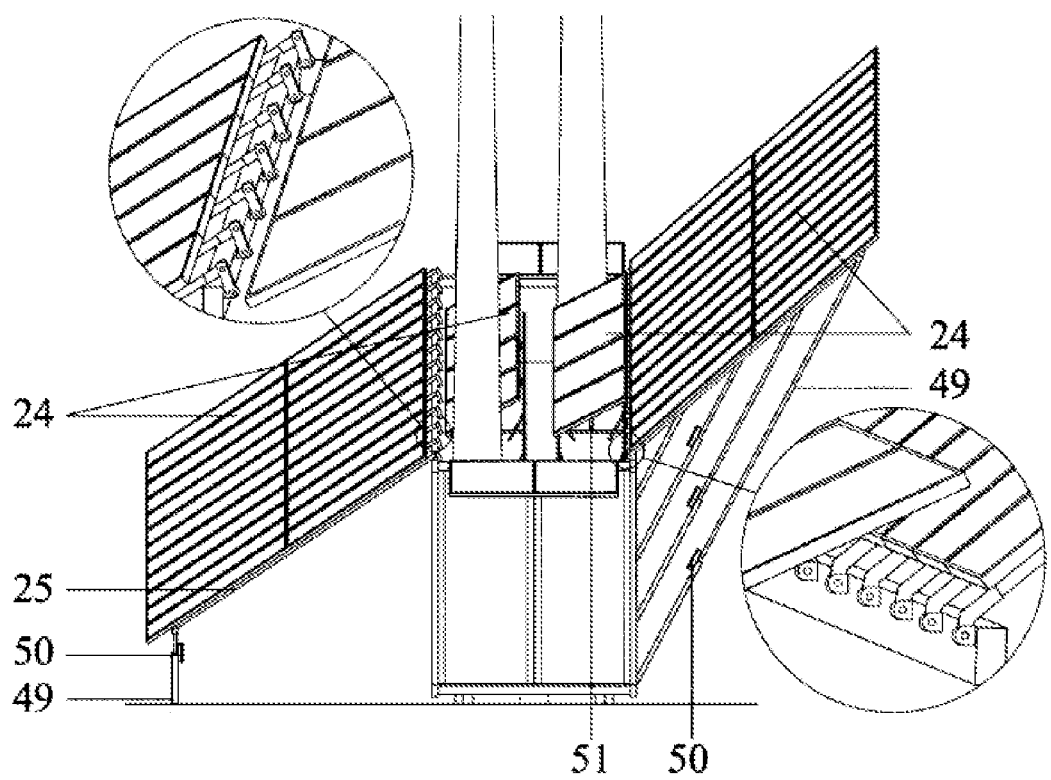
FIG. 14 is the hinge connection between photovoltaic modules arrays and a container.

The connection between arrays and housing is created in the hinge way with the possibility of free movement referring to FIG. 14, so all solar panels (24) together might stay as the whole horizontal surface of arrays (25) which is simultaneously moved on multi-section bars (49) depending on time of year and solar radiation by an automatic/non automatic leveling jack (50) and an actuator (51). The said approach allows periodically getting rid of a snow covering and leaves that may fall on the surface of the panels (24).

Figure 15A:
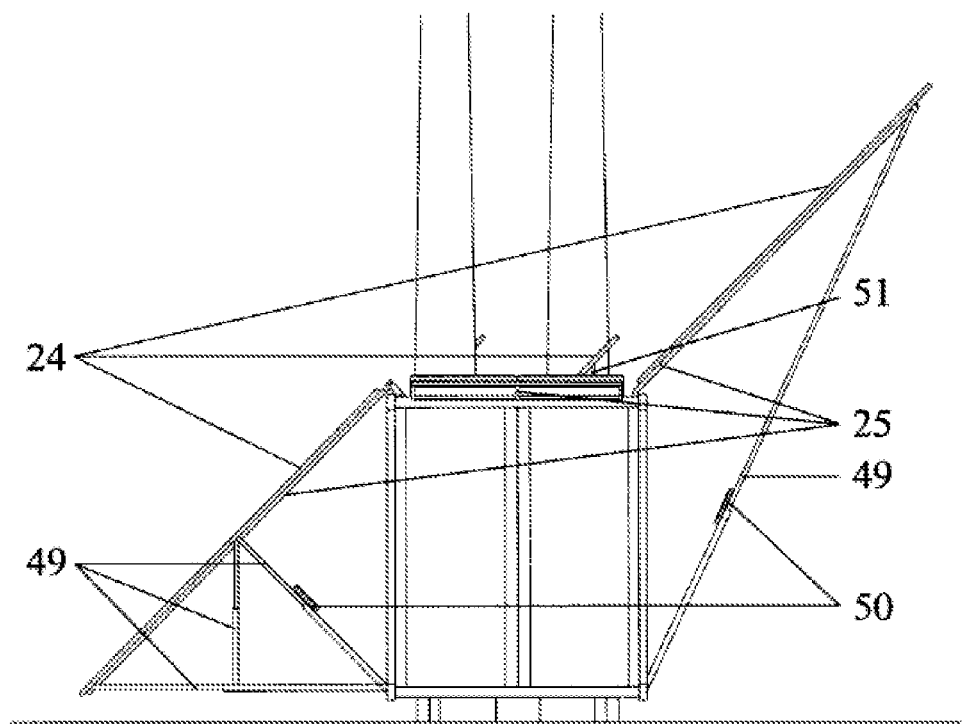
FIG. 15A and FIG. 15B are schemes of photovoltaic module arrays situations at the work phase with leveling jacks demonstration.
Figure 15B:
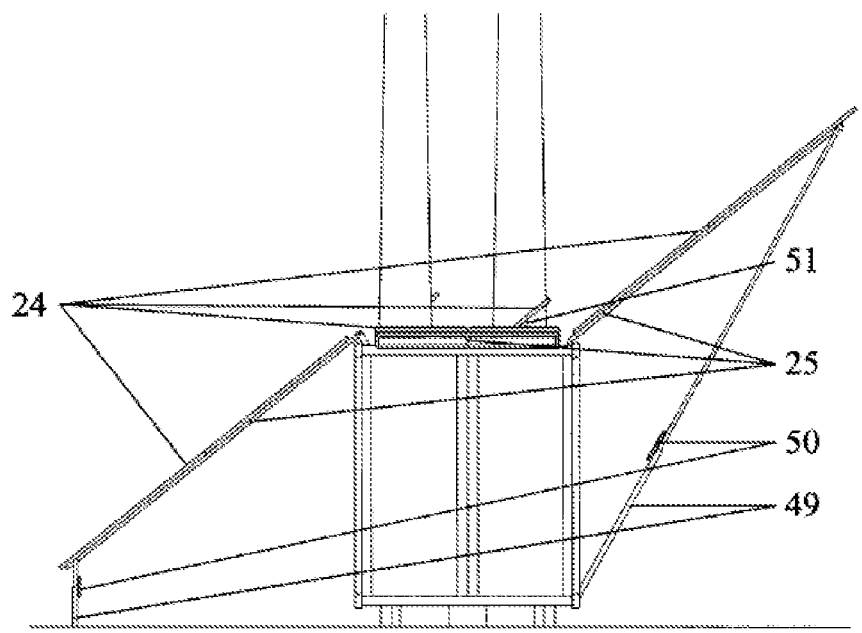

According to FIG. 15A and FIG. 15B there are at least two types of arrays supporting: FIG. 15A-variant wherein the multi-section bars (49) with/without leveling jacks (50) for the low story of arrays are situated between arrays (25) and the lowest container edge; FIG. 1 SB-variant wherein the multi-section bars (49) with/without leveling jacks (50) for the low story of arrays are situated between arrays (25) and the ground. The arrays for photovoltaic two sided panels (24) on the machine (power) part's roof are corrected by actuators (51) so together the low story, the roofs story and the high story of arrays create the whole horizontal surface for solar cells that might be simultaneously directed depending on solar radiation.

Frame structures (25) of solar panels are decomposed by means of hinged mechanisms having extreme positions that prevent their further expansion, thus creating a flat plane for mounting the panels. With these hinges, the frames (25) are stacked on top of the container for the original position, thus not requiring their dismantling. Frame structures (25) of solar panels (24), in the unfolded state, rest on the surface of the earth or attached to the container, which provides the rigidity and stability.

As seen in FIG. 20A, FIG. 20B, FIG. 20C, FIG. 20D, and FIG. 20E photovoltaic module arrays are unfolded to four sides of the container in simultaneously envelope and book layout from store situation to working position. Additional photovoltaic module arrays are lain on the former places of wind turbines' towers (masts) on the machine (power) part's roof giving the whole horizontal surface (39) referring to FIG. 20E. As a result of this special approach, the whole square of solar module frames is at least four times bigger than the container's square is. That allows us to use at least 120 m2 of two sided panels for a 40 ft ISO container without losing a physical connection between housing, arrays, and panels.

Figure 13:
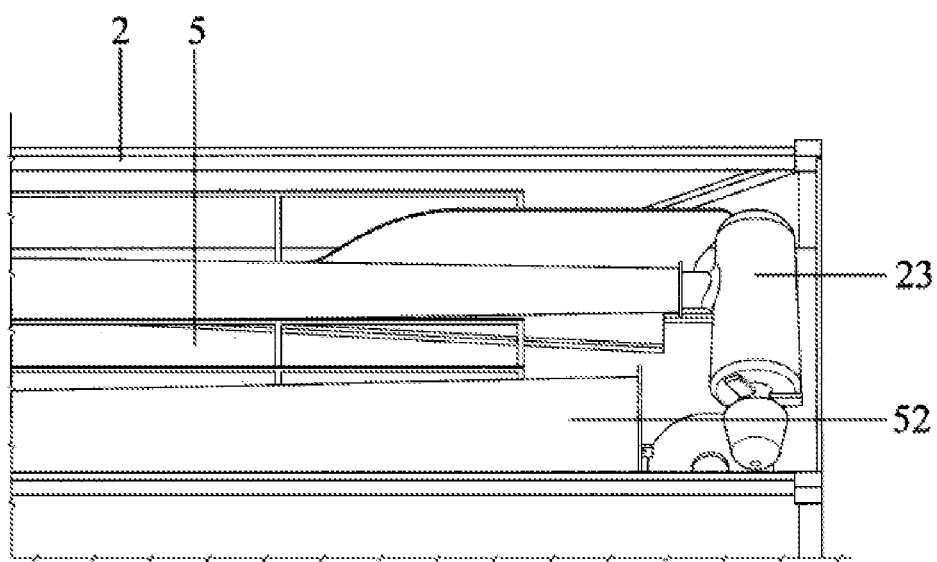
FIG. 13 is a scheme of wind turbines' parts situation at the transport phase.

As it is shown in FIG. 13, in the stowed position wind turbines (23) with turned gondolas and blades, wind vanes taken off are horizontally oppositely situated in the upper part (5) of the container (2). After opening the shutters of the solar panels' arrays, the installations are sequentially raised to the minimum necessary degree for the deployment of the blades, wind vanes, bringing the gondolas and the blades into the working position.

Further, the hydraulic mechanism (or the electric actuator) mounts vertically and extends the concealed towers (52) or telescopic part of each mast to the working position, fixing each mast with ropes to the soil and the container without obstructing the access path to one side of the station (charging points, groups of sockets). Wind turbines are sequentially run in test mode to check for oscillations.

Figure 17A:
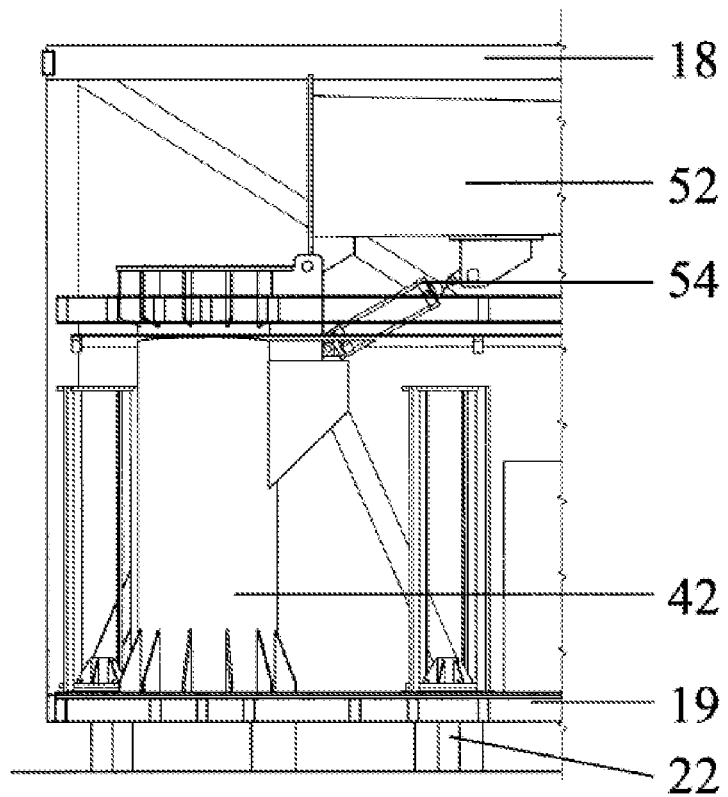
FIG. 17A and FIG. 17B are two phases of the connection between the reinforced column and the turbine's tower trough a hydraulic mechanism (or the electric actuator).
Figure 17B:
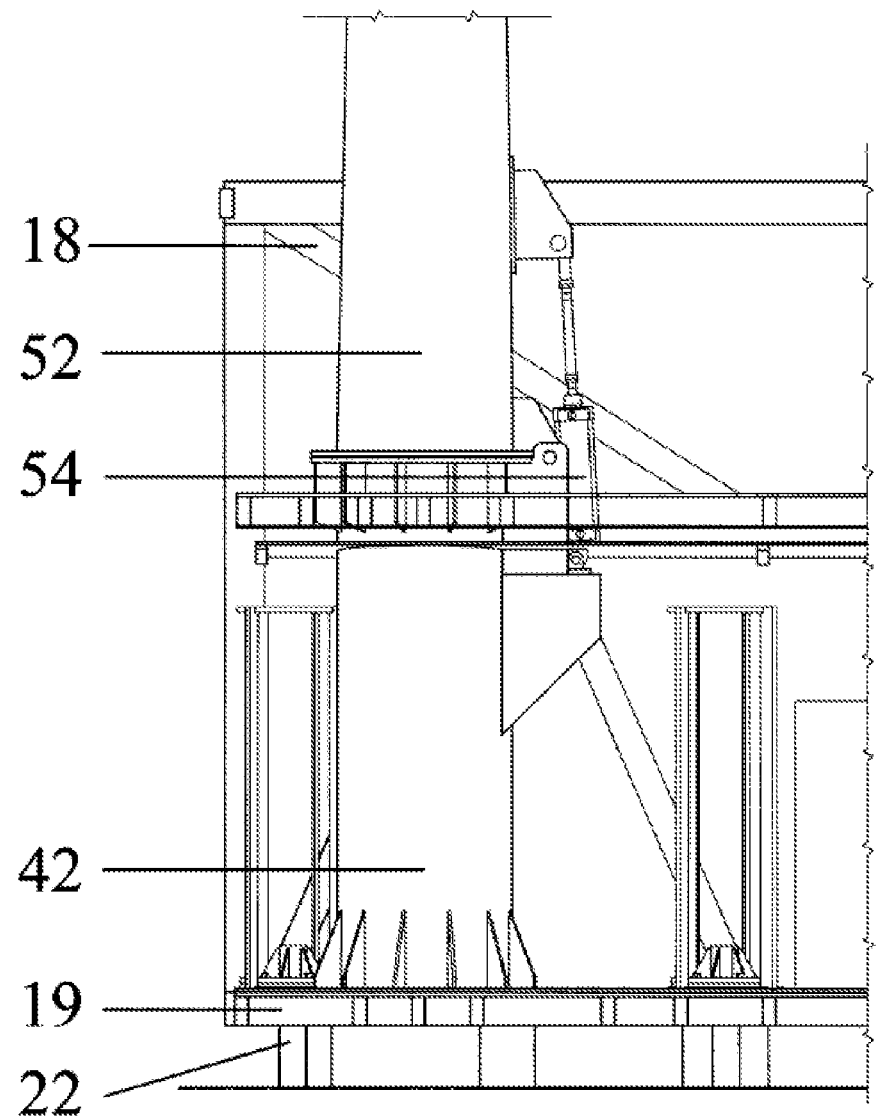

According to FIG. 17A and FIG. 17B the monolith towers (52) or telescopic masts of powerful wind turbines are erected by a hydraulic mechanism for the wind turbine (or an electric actuator) (54). After the monolith towers or telescopic masts are vertically mounted they are fixed to the reinforced internal columns (42) by multi-bolt connection creating altogether the rigid systematic construction between the ground, screw-piles (22), the reinforced grillage (19), the internal columns (42) and the monolith towers (52) or telescopic masts supported by the reinforced hull (18) that prevent any fluctuations. In order to stop water, snow, and dust from getting into the power (machine) part of the container the special casing with drainage under the hydraulic mechanism for the wind turbine (or the electric actuator) (54) is used between the high part's floor and the power (machine) part's ceiling.

Figure 19A:
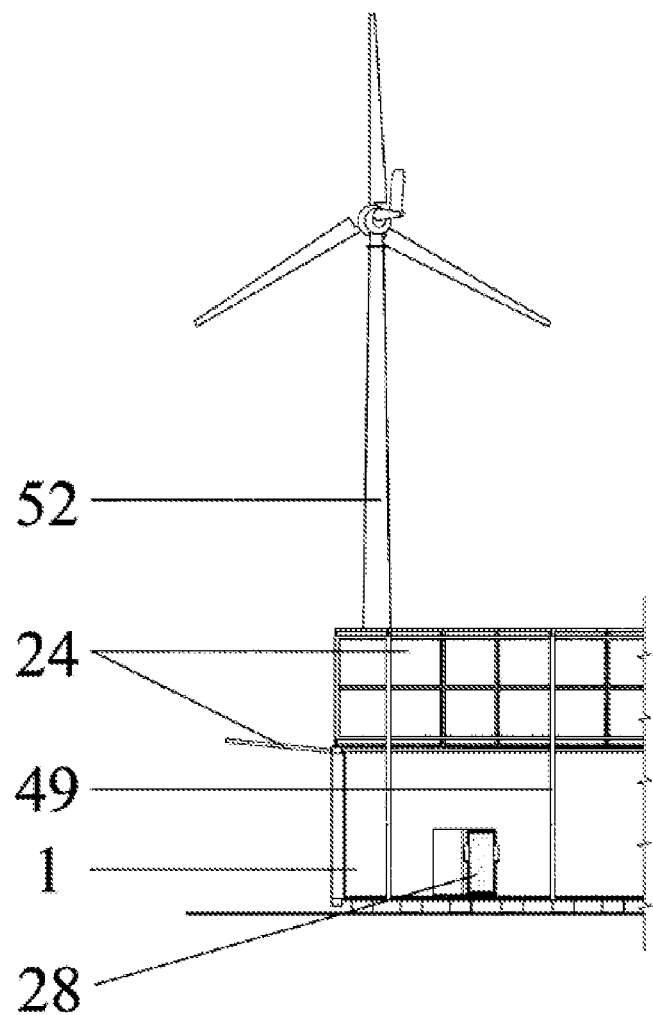
FIG. 19A and FIG. 19B are the demonstration of at least two possible types of wind turbine base (a 14 m monolith tower, a 24 m telescopic mast).
Figure 19B:
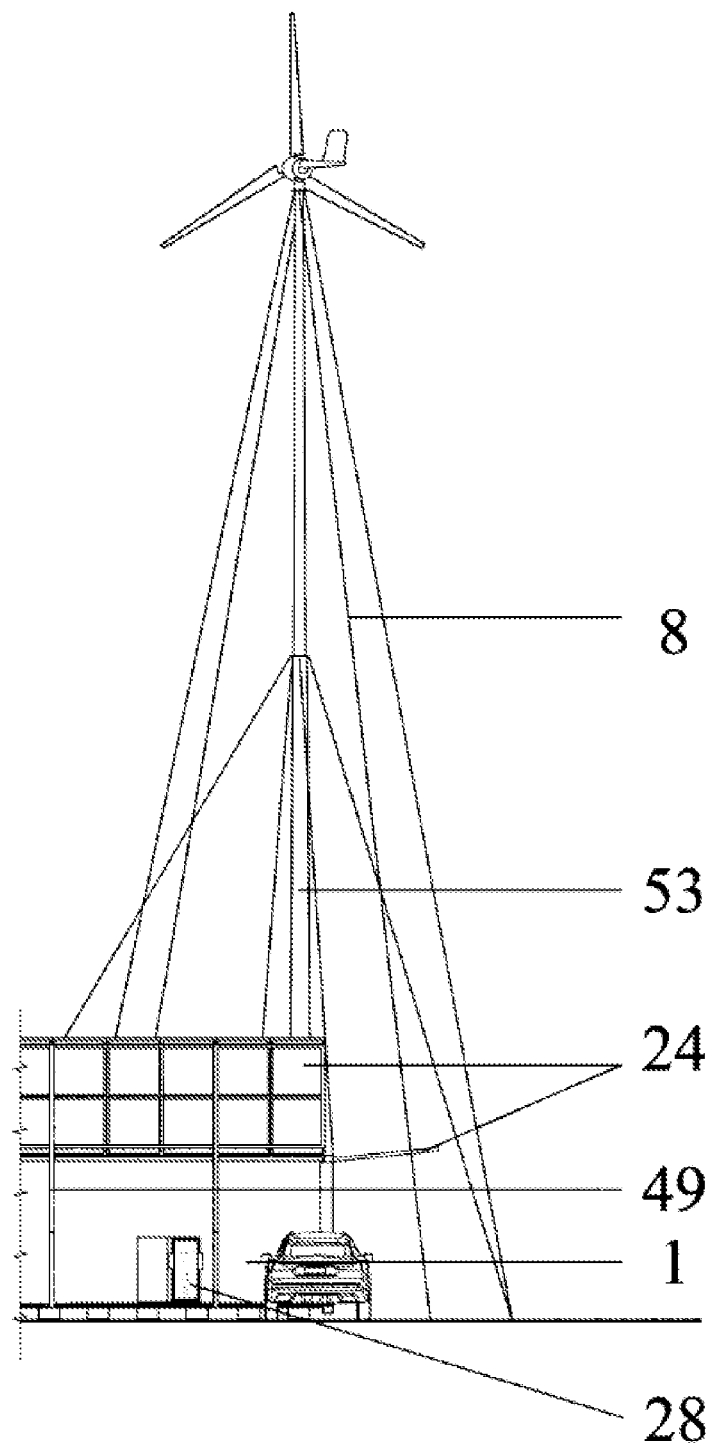
Figure 20A:
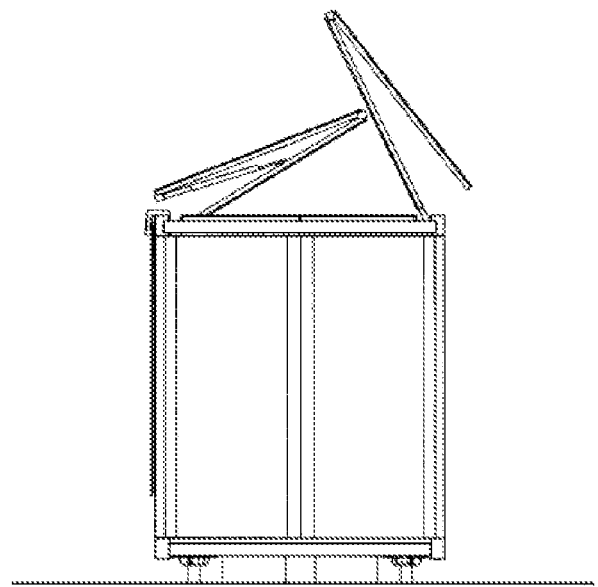
FIG. 20A, FIG. 20B, FIG. 20C, FIG. 20D, and FIG. 20E are a scheme of photovoltaic module arrays unfolding and solar panels mounting.
Figure 20B:
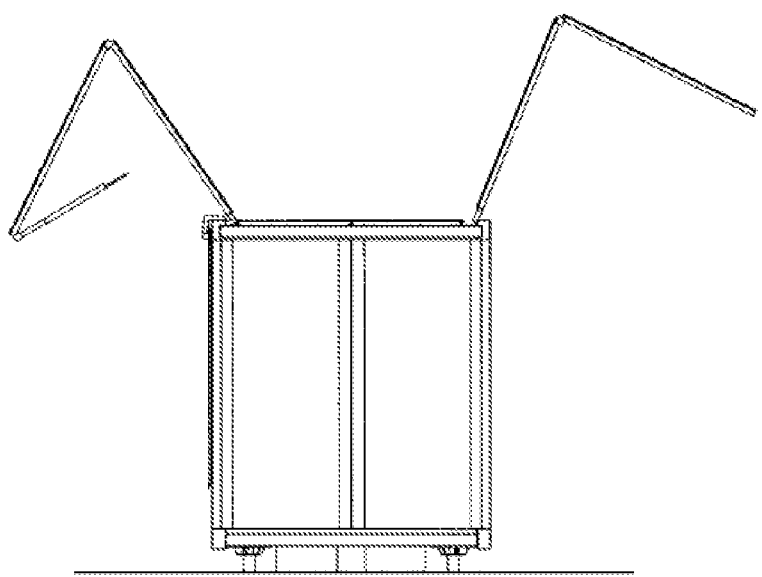
Figure 20C:
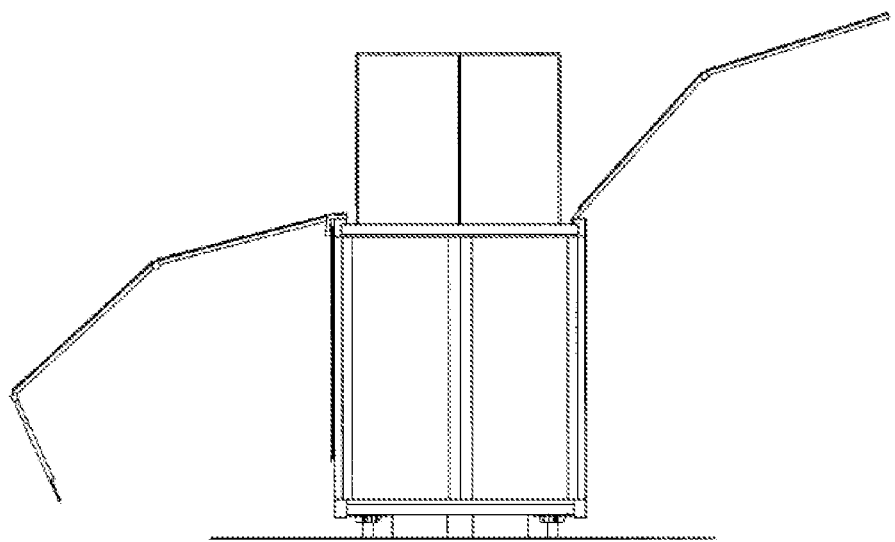
Figure 20D:
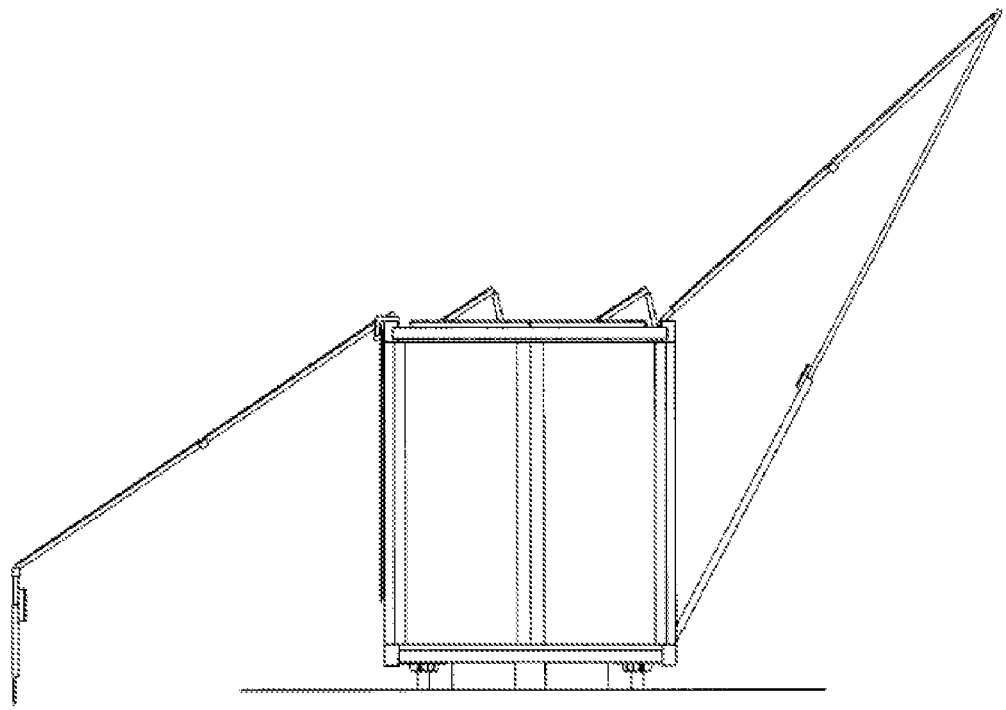
Figure 20E:
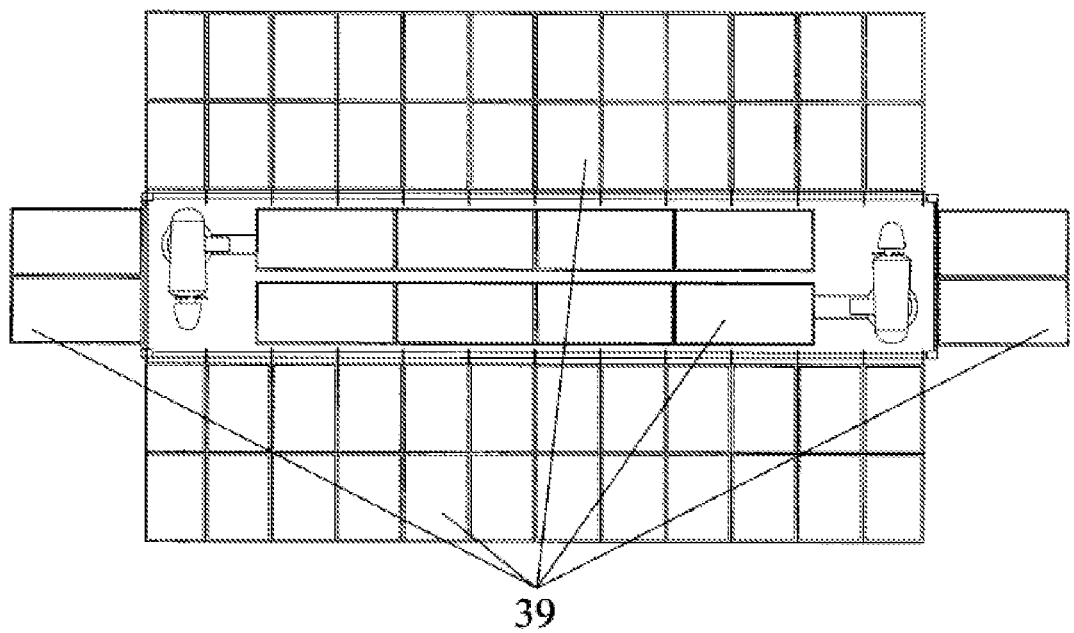
Figure 21:
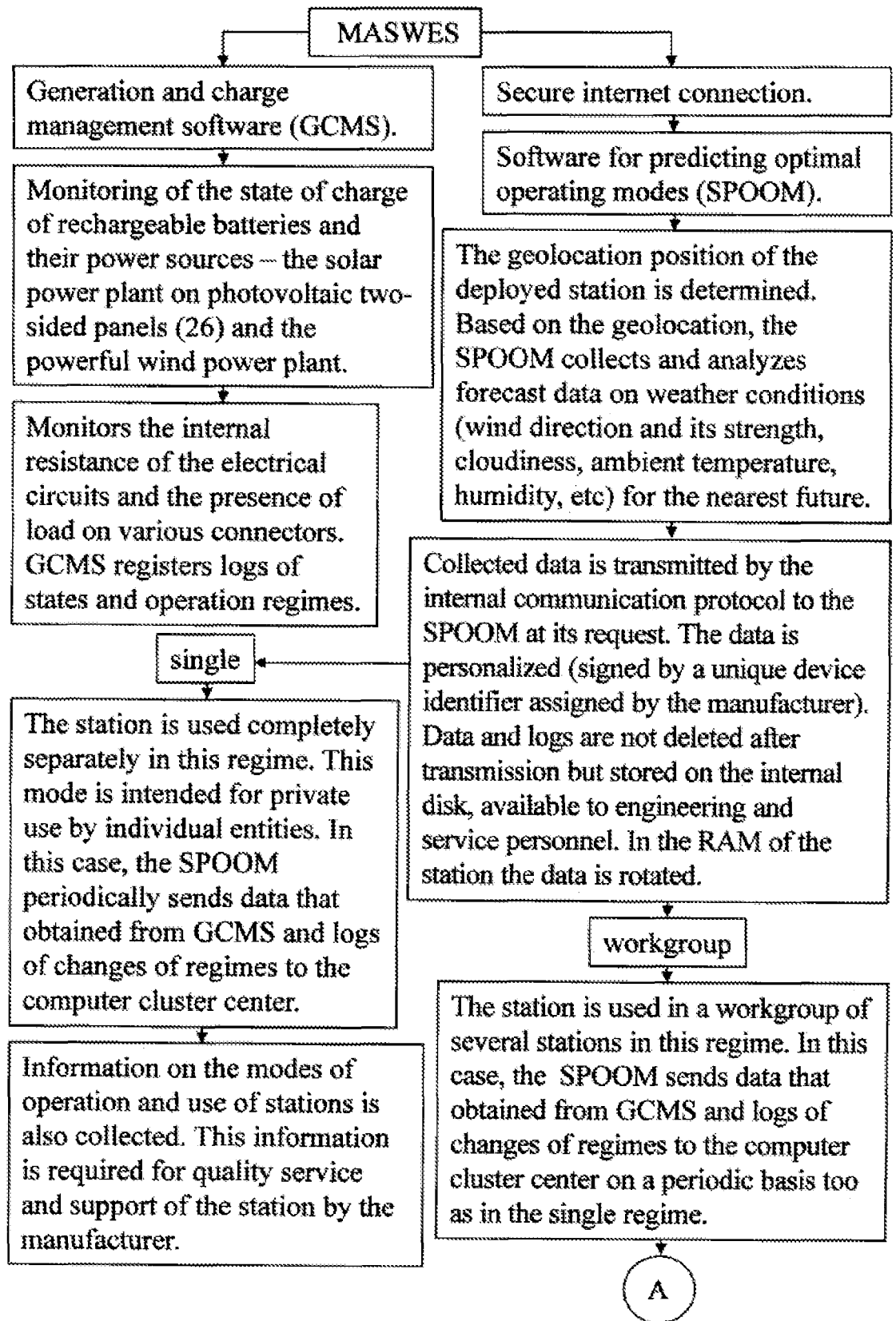
FIG. 21 is the whole conception of MAS WES' software and two regimes of work.
Figure 22:
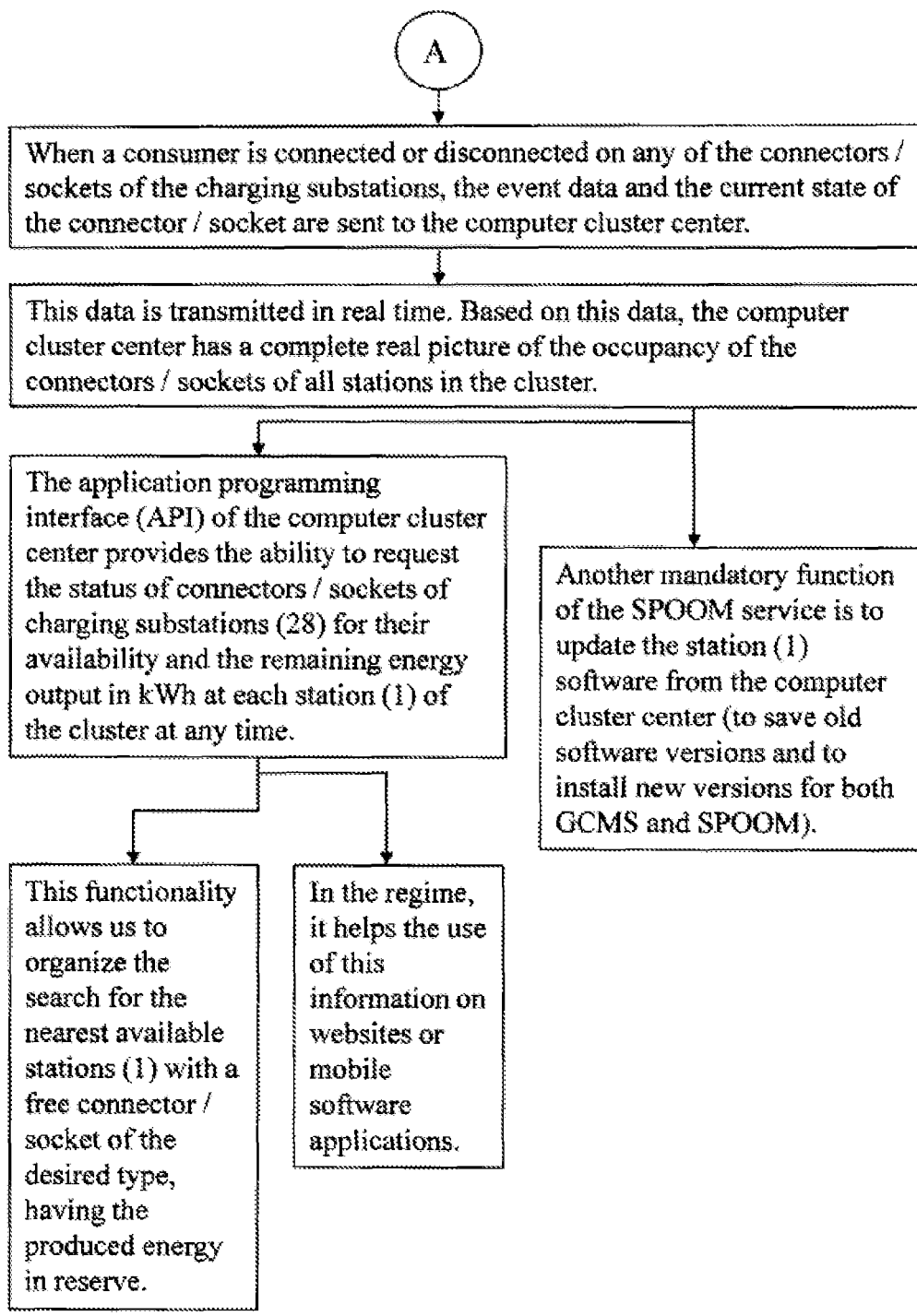
FIG. 22 is the scheme of output data of the MASWES and interacting with consumers.
Figure 23:
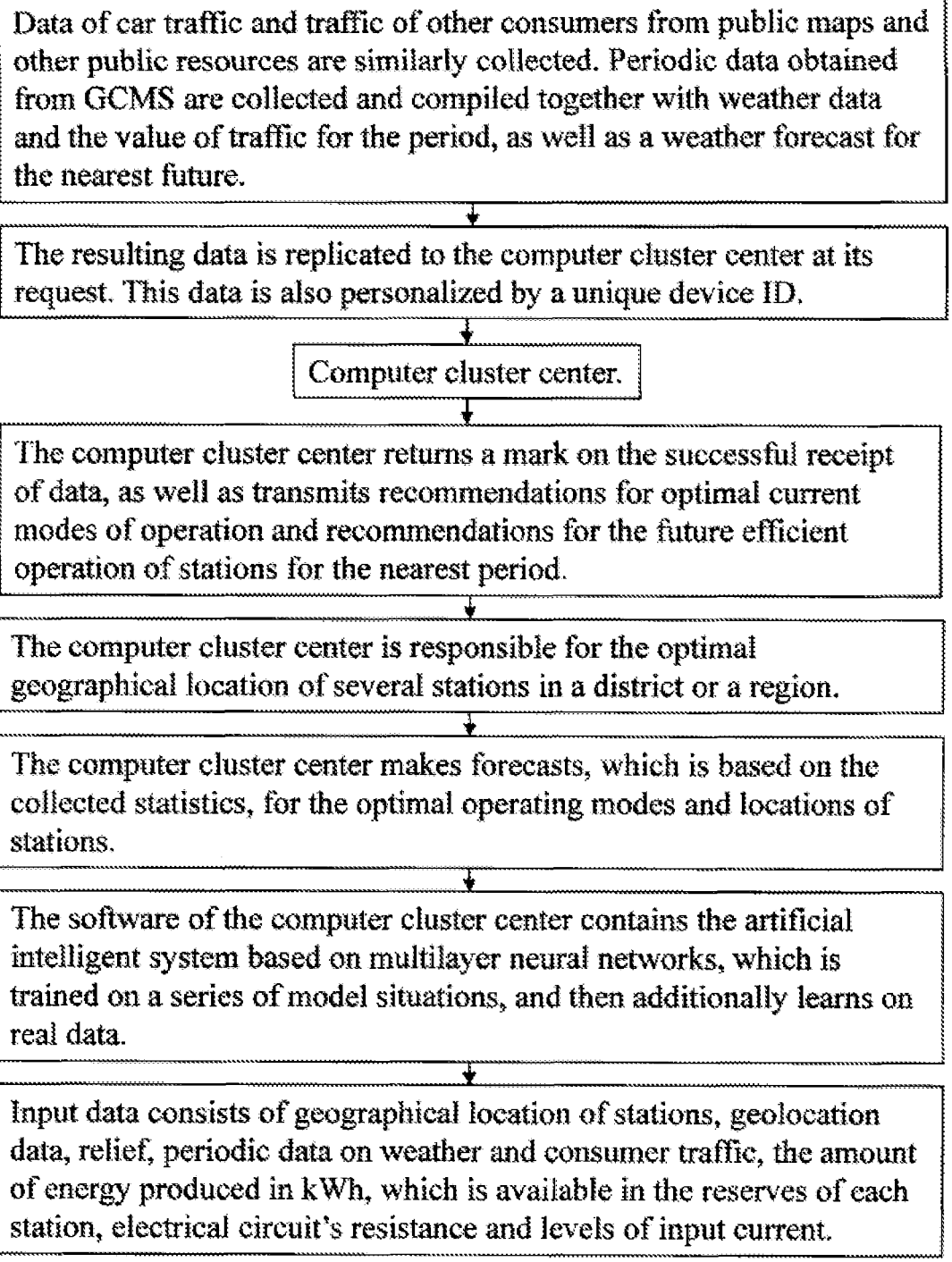
FIG. 23 is the role of the computer cluster center and the artificial intelligence system.

Referring to FIG. 19A and FIG. 19B the Mobile Autonomous Solar-Wind Electrical Station (MASWES) may be completed by one or another type of a wind turbine's base. The first type (FIG. 19A) of a wind turbine works on a monolith tower (52), the second one (FIG. 19B) on a telescopic mast (53) with the ropes system (8) for fixing the wind turbine mast to housing and to the ground. As it is seen in FIG. 19A first variant has at least the 14 m monolith tower and second one (FIG. 19B) is completed by at least a 24 m telescopic mast for a 40 ft ISO container. Other main and auxiliary equipment of stations with different types of the wind turbine's base is similarly comprised, albeit not limited to the whole Mobile Autonomous Solar-Wind Electrical Station by itself (1), photovoltaic two sided panels (24) with supporting multi-section bars (49), at least one charging point or a charging substation (28).

The initial charging carried out at the manufacturing plant should be sufficient to provide all the installation and commissioning work at the MASWES. After the testing of the wind turbines, the solar panel shutters are fixed. The panels are launched. The on-shore wind power plant and the solar power plant are connected to the batteries, other electrical equipment is switched on, the communication network, all systems are tested and all parameters are measured. Security systems are started.

The MASWES shall be connected to a centralized power supply network as needed and technically feasible. Necessary preparation and coordination of this with the energy provider occur in advance. In case of a lack of self-power of the station, power is supplied from the central network. In case of energy surplus, when the capacity of the battery of the station is not enough for accumulation, and in the absence of consumers, there is a return supply from the MASWES to the network at a 'green' tariff.

In the normal operation of all systems, sliding doors are opened from the client-side of the container, blocks of connectors and the payment terminals as charging points (groups of sockets) are pushed forward to reach the outside, fixed to the housing, and their testing is carried out. On the ground, curbs are laid about 1 m from the container to prevent electric vehicles from colliding with the station. The MASWES is ready to work with consumers. The maximum installation time for the MASWES is one day when provided by a two electricians' team plus a truck driver (at most three people total).

Figure 4:
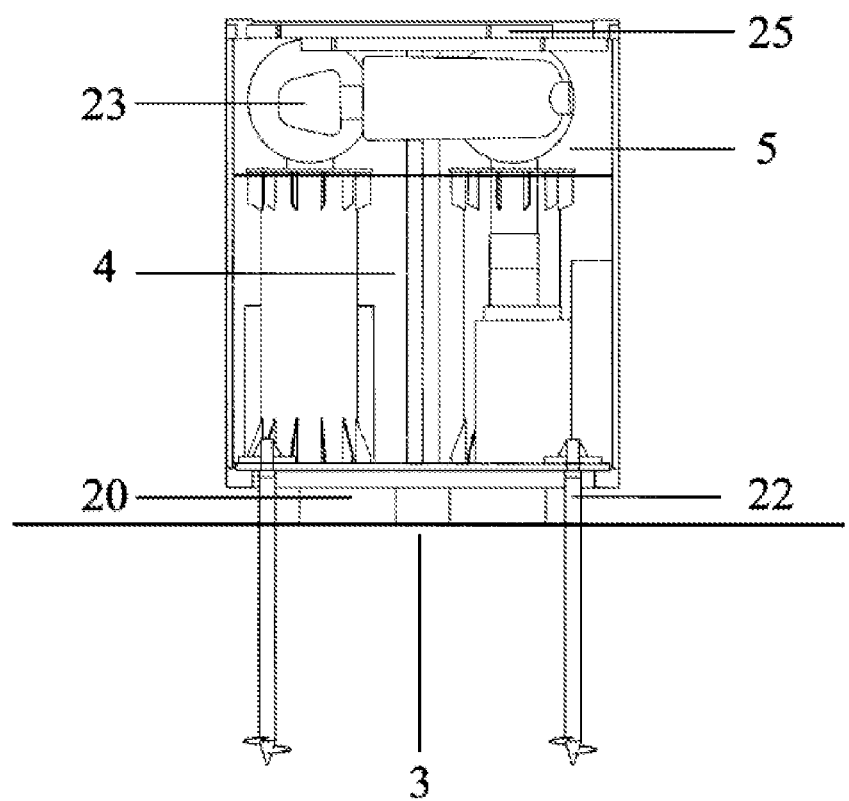
FIG. 4 is the MAS WES consists of three parts (levels): 1) the foundation part; 2) the waterproof power (machine) part; 3) the wind turbines and arrays part.

According to FIG. 4 the standard sea container as an element of the Mobile Autonomous Solar-Wind Electrical Station (MASWES) is structurally divided by three parts (levels): the ground blocks, light reflecting mats and movable screw-pile foundation part (3); the electrical and another equipment waterproof part (4); the powerful wind turbines and multi-time folded photovoltaic modules arrays part (5). In the stowed position, multi-column photovoltaic panels' arrays (25) are folded above powerful wind turbines (23) under the proof container's roof. The reversible screw-piles (22) strongly press housing to the land but ground blocks (20) prevent the container from the lowest position (from colliding with the ground).

Figure 6:
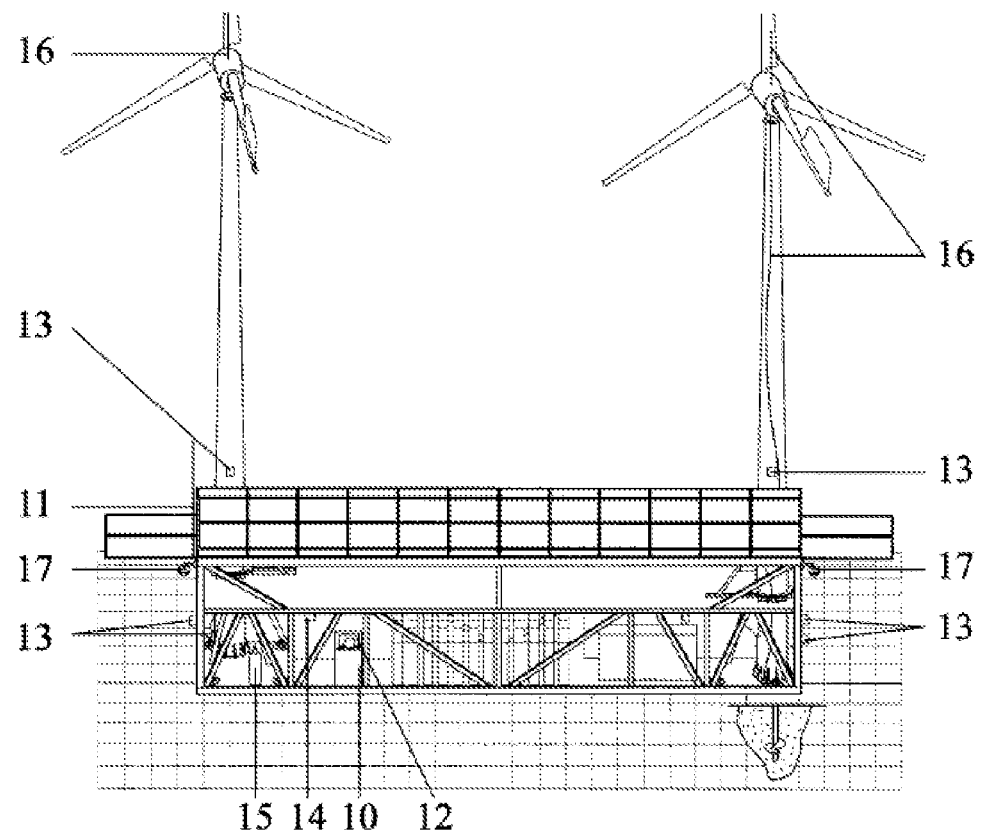
FIG. 6 is the internal view of the MASWES including auxiliary equipment.

It may be seen from FIG. 6 that the Mobile Autonomous Solar-Wind Electrical Station (MASWES) includes next auxiliary equipment, albeit not limited to the station control and service center communication modules (10), an antenna (11), a computer (12), weather, temperature, fluctuation, safety and other sensors (13), a fire alarm (14), a fire extinguisher (15), video surveillance (17) and a lightning protection device (16) wherein screw-piles are used as the ground rods. All MASWES' electronic equipment can be monitored and managed distantly through the safe channel of communication.

Figure 7:
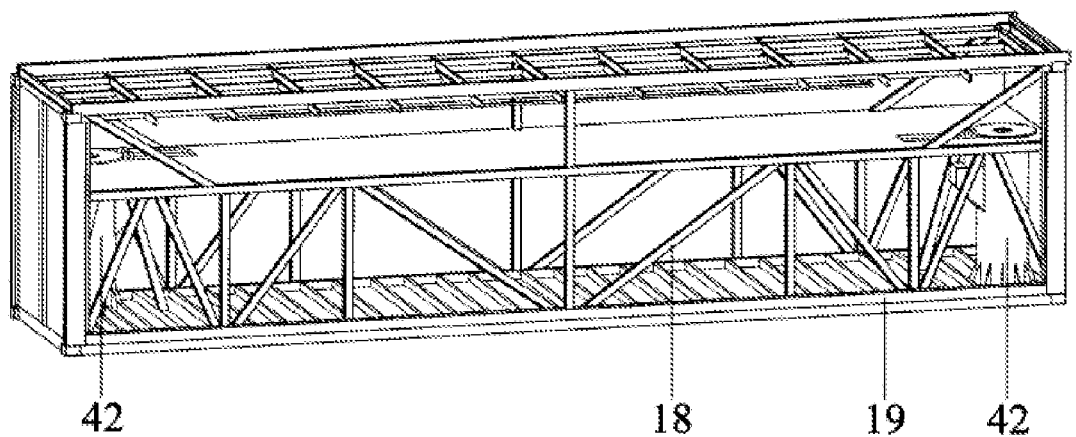
FIG. 7 is a reinforced grillage and a hull of the MASWES with reinforced internal columns.

As it is shown in FIG. 7, the strong metal construction of housing consists of the reinforced hull (18), the reinforced grillage (19) and at least two reinforced internal columns (42) situated at the opposite corners (approximately diagonally) between the containers grillage and the middle level of the reinforced hull (18), which all together create the whole powerful rigid system: the ground—the screw-piles—the reinforced container's grillage—the reinforced hull—the internal columns—the wind turbine s towers (or masts).

Figure 8:
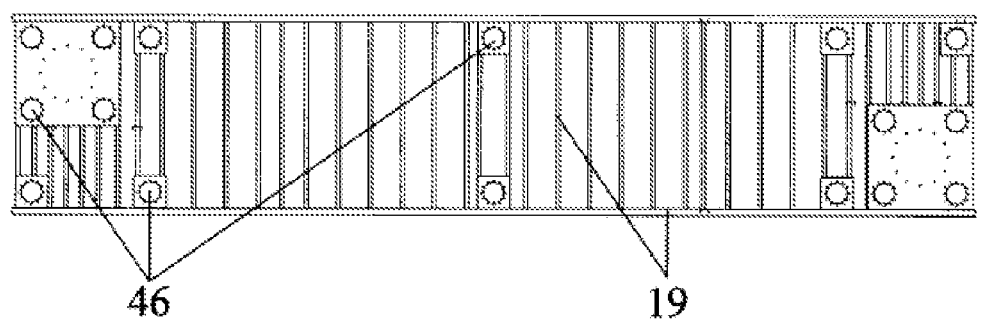
FIG. 8 is a scheme of the reinforced grillage.

FIG. 8 shows a scheme of the reinforced grillage (19) strong metal construction is provided by at least two girders being laid lengthwise and by a plurality of beams being laid across for a 40 ft container. Additionally, there are at least two places prepared for the internal columns mounting and a plurality of screw-pile holes (46), which are positioned across the container's square in such a way that they can evenly accept static loads. The container frame as the reinforced hull (18) is a solid welded construction of the metal channel of the required size to ensure rigidity, as it can be seen from FIG. 7. All of these beams are arranged in such a way to give the container additional rigidity and stability.

Figure 9:
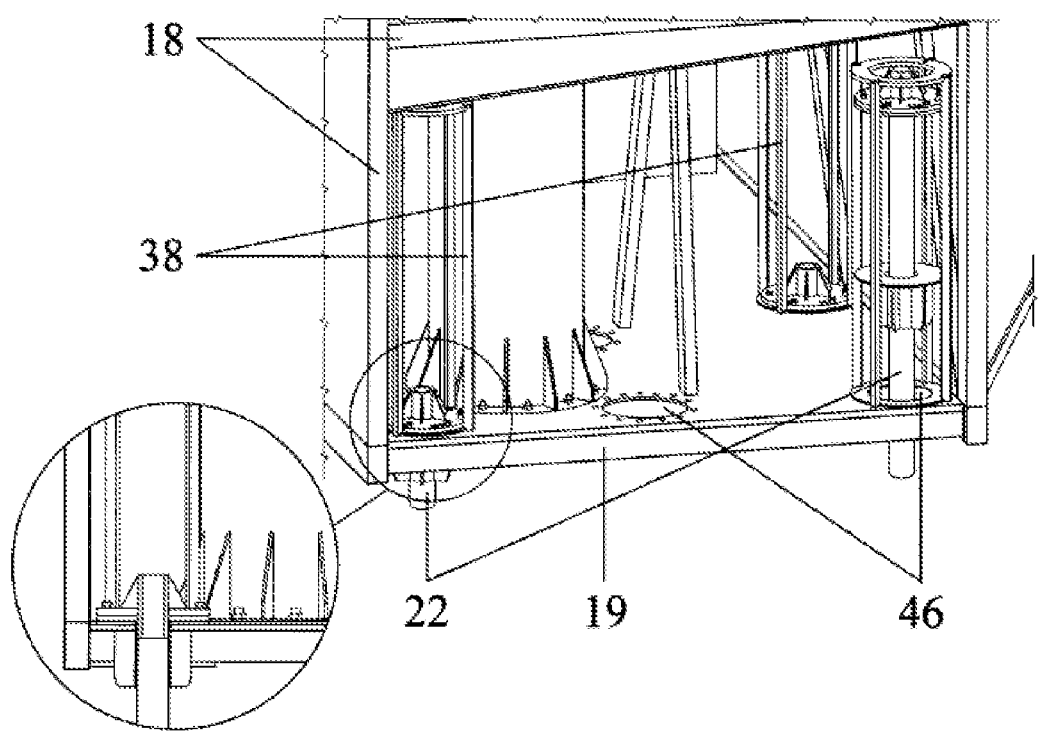
FIG. 9 is a scheme of the reinforced grillage and a screw-pile connection.

FIG. 9 shows a scheme of connection between a screw-pile (22) and the reinforced grillage (19). The first one (22) is screwed through a special hole (46) in the reinforced grillage (19) of the container with a guide sleeve, which is moved vertically, that is inserted into the hole (46) and a special guide structure—the special cylindrical channel for a screw pile (38). Screwing is carried out by a rotary hydraulic power head or an electric motor with a planetary gearbox (or a worm geared motor). After they are fully screwed in and fixed to the reinforced grillage (19) by means of multi-bolt connection, they together with the reinforced hull (18), the reinforced internal columns and wind turbines' towers (masts) create a monolithic structure that provides rigidity and stability of the MASWES.

Figure 10:
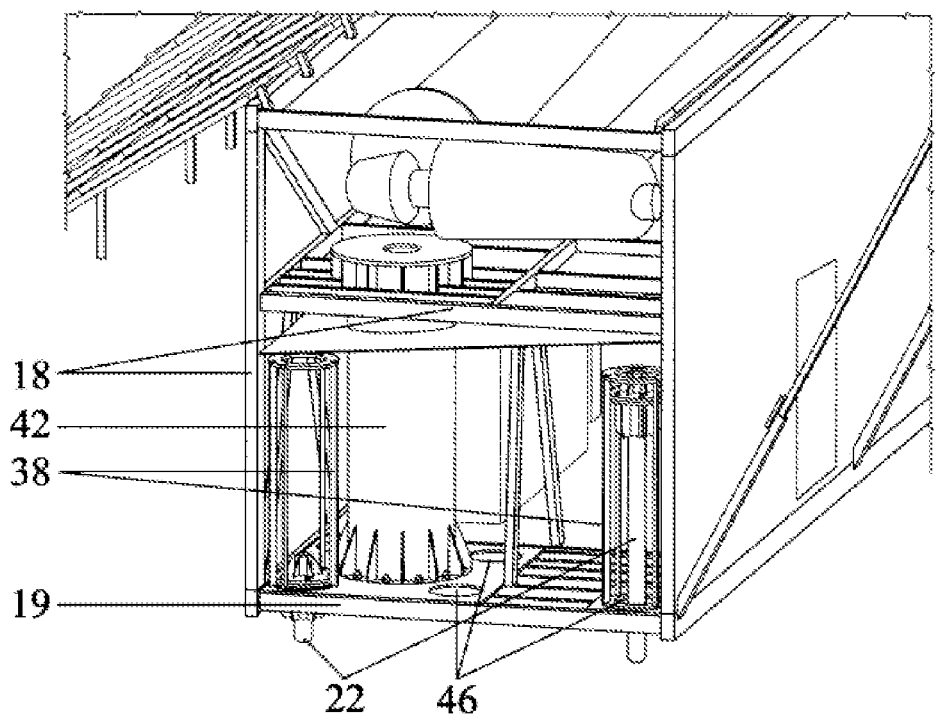
FIG. 10 is a scheme of the reinforced grillage and the internal column connection.

FIG. 10 shows that the internal column (42) is fastened to the reinforced grillage (19) by multi-bolt connection at the lowest zone and creates a wholly welded construction with the middle part of the reinforced hull (18) at the highest zone of the internal column. The housing comprising the internal column, the reinforced grillage, and the reinforced hull is strongly tightened to the ground by screw-piles (22) moving through the special cylindrical channels (38) and the holes (46).

Figure 12:
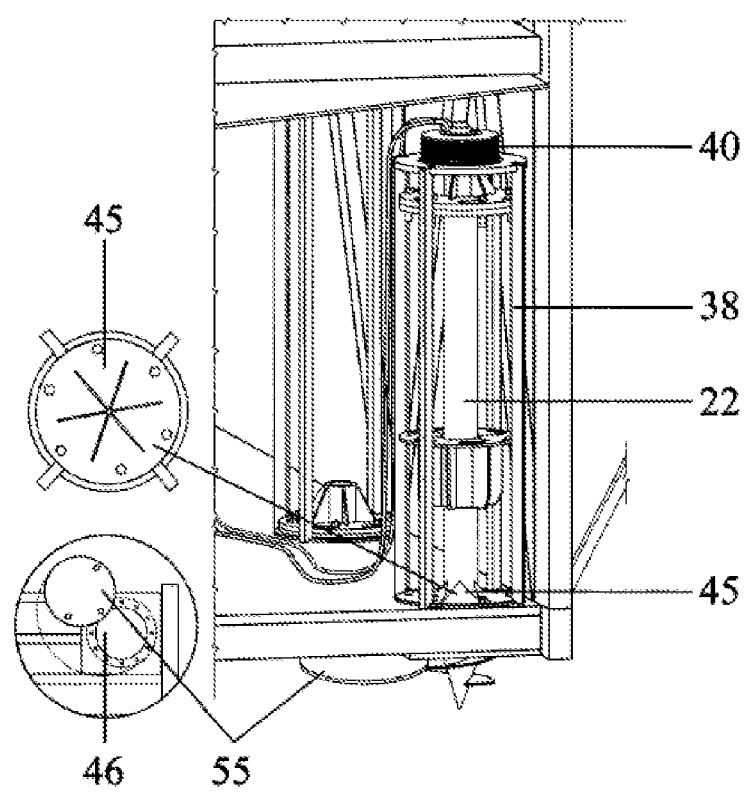
FIG. 12 is a scheme of a screw pile propulsion from the inside position to outside.

Referring to FIG. 12 screw-piles (22) are moved through special cylindrical channels—a special guide structure (38) with a freely moving guide sleeve and are moved from the container space into the soil (natural or previously prepared). Similarly, they are put back by a rotary hydraulic power head (40) or an electric motor with a planetary gearbox (or a worm geared motor). The perforated safe rubber shadows (45) are situated on the container's floor and cover all screw-pile holes (46) from the internal side and prevent snow, water, and dust from getting inside. From the external, side screw-pile holes (46) are locked by a hatch (55) sliding horizontally.

The floor of the powerful wind turbines and multi-time folded photovoltaic modules arrays part (5) of the container as seen in FIG. 13 consists of perforated steel (or other metal) sheets laid on the middle part of the reinforced hull (18) referring to FIG. 10. Waterproofness of the electrical and another equipment part (4) is achieved by flexible polycarbonate or similar material whole sheet situated with several angles with drainage allowing water and melted snow out of the container.

Figure 16:
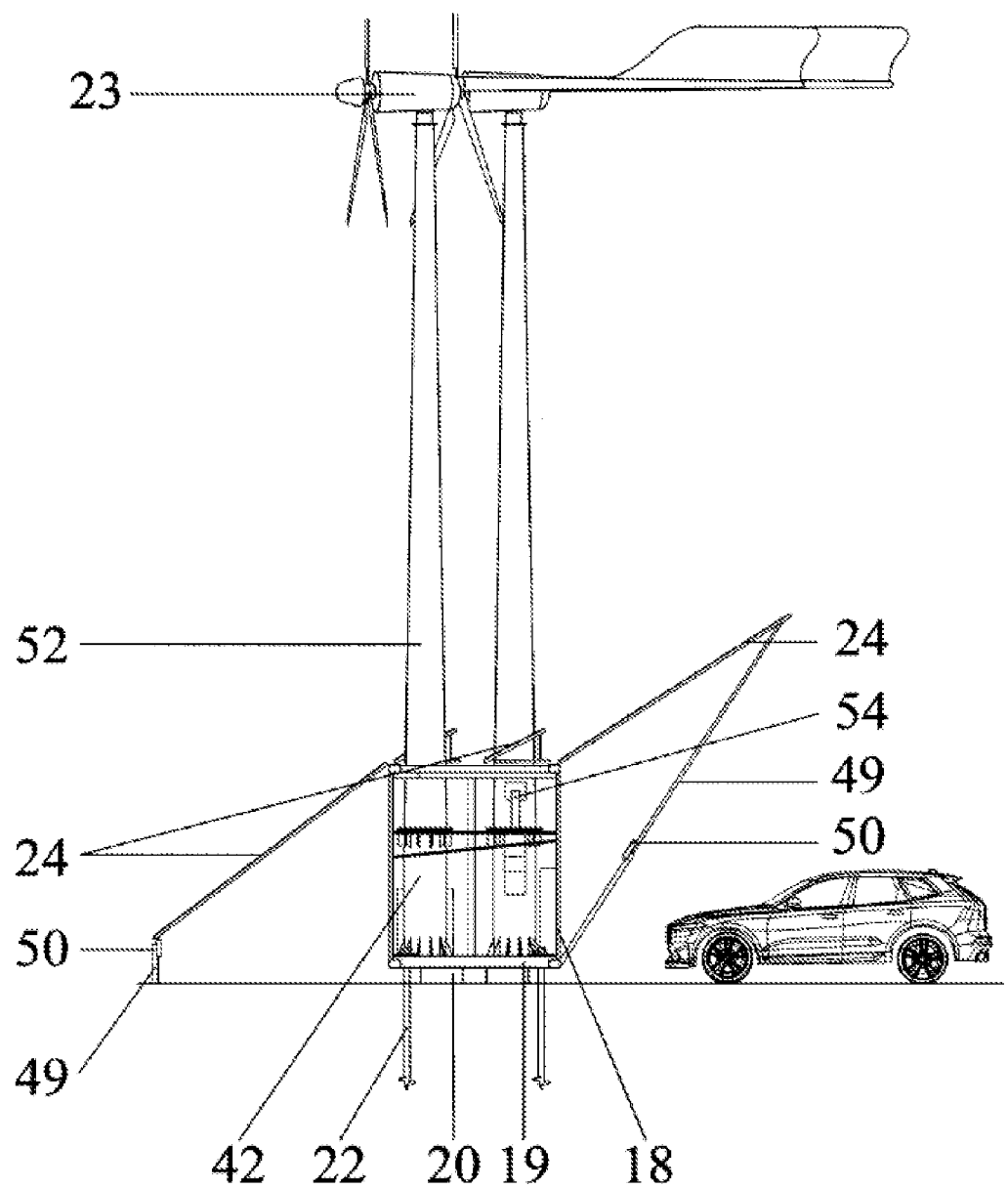
FIG. 16 is a system of a wind turbine stabilization from the field to a turbine's tower.

FIG. 16 supports the previous one by adding next elements in the picture: the movable screw-piles (22), the ground blocks (20), the reinforced grillage (19), the reinforced hull (18), the reinforced internal columns (42), multi-section bars (49) with an automatic or non automatic leveling jacks (50), photovoltaic two sided panels (24), monolith towers (52) with the hydraulic mechanism for erecting (or the electric actuator) (54), the powerful wind turbines (23).

Figure 18:
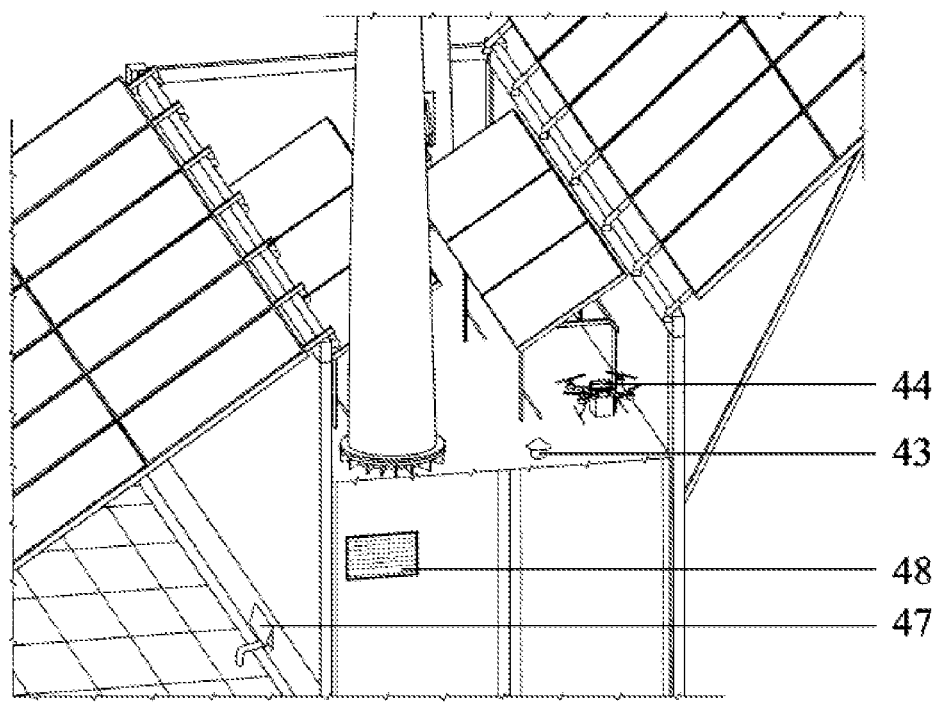
FIG. 18 is the system of different openings: at the service zone (for drones), for grid connection, for ventilation.

Different special openings of the container are shown in FIG. 18, such as the roof openings (43) in the service area for supplying or disposal of working fluids, for drones (44) and other unmanned aerial vehicles charging from MASWES, the hatch for on-grid connection (47), the safe ventilation openings on the container's walls (48).

The MASWES software must ensure a uniform charge of each battery regardless of the weather conditions, i.e., simultaneous charging from two sources (sun, wind) or switching from one source to another. When all batteries reach maximum capacity, the transmission of power begins to move directly to the charging points or, in the absence of consumers, the operation of the wind installation and solar panels is temporarily interrupted if the MASWES is not connected to the power grid. The operation of the on-shore wind power plant is also suspended when the wind exceeds the normative one.

The software of MASWES (1) consists of the two subsystems:
  generation and charge management software (GCMS);
  software for predicting optimal operating modes (SPOOM);

To increase reliability, each software subsystem operates as an independent service and data exchanging between them is organized.

GCMS provides monitoring of the state of charge of rechargeable batteries and their power sources—the solar power plant on photovoltaic two-sided panels (26) and the powerful wind power plant (27). In addition, it monitors the internal resistance of the electrical circuits and the presence of load on various connectors. GCMS registers logs of states and operation regimes. Collected data is transmitted by the internal communication protocol to the SPOOM at its request. The data is personalized (signed by a unique device identifier assigned by the manufacturer). Data and logs are not deleted after transmission but stored on the internal disk, available to engineering and service personnel. In the RAM of the station (1) the data is rotated.

In the presence of a secure internet connection, the SPOOM is activated. Internet connection is provided in compliance with local, regional, or global standards. The geolocation position of the deployed station (1) is determined. Based on the geolocation, the SPOOM collects and analyzes forecast data on weather conditions (wind direction and its strength, cloudiness, ambient temperature, humidity, etc) for the nearest future. There are two regimes of software operation: single and workgroup.

Single—the station (1) is used completely separately in this regime. This mode is intended for private use by individual entities. In this case, the SPOOM periodically sends data that obtained from GCMS and logs of changes of regimes to the computer cluster center.

Information on the modes of operation and use of stations (1) is also collected. This information is required for quality service and support of the station by the manufacturer.

Workgroup—the station is used in a workgroup of several stations in this regime. In this case, the SPOOM sends data that obtained from GCMS and logs of changes of regimes to the computer cluster center on a periodic basis too as in the single regime. Data of car traffic and traffic of other consumers from public maps and other public resources are similarly collected. Periodic data obtained from GCMS are collected and compiled together with weather data and the value of traffic for the period, as well as a weather forecast for the nearest future. The resulting data is replicated to the computer cluster center at its request.

This data is also personalized by a unique device ID. The computer cluster center returns a mark on the successful receipt of data, as well as transmits recommendations for optimal current modes of operation and recommendations for the future efficient operation of stations (1) for the nearest period.

The computer cluster center is responsible for the optimal geographical location of several stations in a district or a region. The computer cluster center makes forecasts, which is based on the collected statistics, for the optimal operating modes and locations of stations. The software of the computer cluster center contains the artificial intelligent system based on multilayer neural networks, which is trained on a series of model situations, and then additionally learns on real data. Input data consists of geographical location of stations, geolocation data, relief, periodic data on weather and consumer traffic, the amount of energy produced in kWh, which is available in the reserves of each station (1), electrical circuit's resistance and levels of input current.

In the workgroup regime, when a consumer is connected or disconnected on any of the connectors/sockets of the charging substations (28), the event data and the current state of the connector/socket are sent to the computer cluster center. This data is transmitted in real time. Based on this data, the computer cluster center has a complete real picture of the occupancy of the connectors/sockets of all stations (1) in the cluster. The application programming interface (API) of the computer cluster center provides the ability to request the status of connectors/sockets of charging substations (28) for their availability and the remaining energy output in kWh at each station (1) of the cluster at any time. This functionality allows us to organize the search for the nearest available stations (1) with a free connector/socket of the desired type, having the produced energy in reserve. It helps the use of this information on websites or mobile software applications.

Another mandatory function of the SPOOM service is to update the station (1) software from the computer cluster center (to save old software versions and to install new versions for both GCMS and SPOOM).

The Mobile Autonomous Solar-Wind Electrical Station (MASWES) is organized on exclusively renewable sources and might be connected to the grid in the case of shortage of solar radiation or/and wind power, if it is possible on a certain territory.

As seen in said figures, MASWES consists of only one standard offshore container as a station's base completely adapted for shipping and does not have any protruding parts which would complicate a transportation task by sea, road, railway, or air.

The mechanism and the approach of storing, folding, and installing photovoltaic modules and their arrays showed enough are simple, cheap, do not need additional power, and may be provided by two crewmembers for at most one day among other installing procedures. The approximate annual output of the solar power plant is at least 44,000 kWh.

The ways of storing, folding, and installing wind turbines and their towers (masts), gondolas, blades, wind vanes fully written at that invention allow using powerful at least two minimum 10 kW power each horizontal-axis ones for 40 ft container as a station's base. All installing procedures are carried out by two crewmembers with crew's equipment and previously accumulated power. The on-shore wind power plant approximately gives at least 80,000 kWh of the annual output.

The whole MASWES provides at least 124,000 kWh annually.

The tools for stabilizing the Mobile Autonomous Solar-Wind Electrical Station (MASWES) on the ground, meaning two powerful wind turbines are completely shown and to include: the reversible foundation part—the movable screw-piles, the reinforced hull, the reinforced grillage, the reinforced internal columns, the ropes system for fixing a wind turbine mast, and others.

All conditions are prepared for charging different electric consumers such as electric cars, scooters, bicycles, etc., as well as for households, farms, agriculture (for example, electric tractors, drones, other unmanned aerial and land vehicles) and mining companies or for military use.

The present invention is concentrated on only one great task—to provide electric power from renewable sources for a wide range of remote electric consumers regardless of grid existing in the max economically effective and absolutely sustainable way, which is useful in the current awful ecological situation around the world. There is no internal combustion engine and a fuel tank, a gas/diesel generator, a water filtration system, a water distribution system, etc.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents,rather than by the examples given.

The embodiments of the invention in which an exclusive property or privilege is claimed are defined as follows:

1. A Mobile Autonomous Solar-Wind Electrical Station (MASWES) comprising:
    an offshore container;
        the offshore container fitted with:
            a reinforced hull;
            reinforced grillage provided by at least two girders being laid lengthwise and by a plurality of beams being laid across the container;
            at least two reinforced internal columns situated at the opposite corners between the container's grillage and the middle level of the reinforced hull;
            a plurality of light reflecting mats;
            a plurality of movable screw-piles;
            a plurality of cylindrical channels;
            the plurality of movable screw-piles stored within the plurality of cylindrical channels;
            at least two monolith towers or telescopic masts of powerful horizontal-axis wind turbines providing at least 10 kW power each and at least 14 m height each for 40 ft container, at least 20 kW power total, with blades and wind vanes taken off;
        turned gondolas are horizontally oppositely mounted along with the container in the stowed position,
        a plurality of photovoltaic two sided panels;
        a plurality of multi-time folded photovoltaic module arrays providing at least 30 kW power total,
        one or more charging points stored inside the container;
        one or more rechargeable batteries;
        at least two reinforced internal columns with a hydraulic mechanism (or an electric actuator) as the foundation; and
        an erection tool accordingly for monolith towers (telescopic masts).

2. The power station of claim 1, wherein
screw-piles are moved through special cylindrical channels—a special guide structure with a freely moving guide sleeve and are moved from the container space into the soil;
perforated safe rubber shadows are situated on the container's floor and cover all screw-pile holes from the internal side and prevent snow, water, and dust from getting inside;
side screw-pile holes are locked by a hatch sliding horizontally;
wind turbines and multi-time folded photovoltaic modules arrays part of the container consists of perforated steel sheets laid on the middle part of the reinforced hull; and
waterproofness of the electrical and another equipment part is achieved by flexible polycarbonate or similar material whole sheet situated with several angles with drainage allowing water and melted snow out of the container.

3. The power station of claim 1, further comprising automatic or non automatic leveling jacks for multi-section bars; and
a hydraulic mechanism (or an electric actuator) for erecting the wind turbines' towers (masts);
one or more openings of the container such as the roof openings in the service area for supplying or disposal of working fluids, for drones and other unmanned aerial vehicles charging;
a hatch for on-grid connection; and
the safe ventilation openings on the container's walls.

4. The power station of claim 1, further comprising
a photovoltaic two sided panels power plant;
a powerful wind energy power plant;
at least one charging point or charging substation;
one or more load breaker with a fuse;
one or more hybrid inverters;
one or more rechargeable batteries;
an off-grid controller;
an on-grid controller;
a heat pump with the refrigerant;
a conditioner,
an own needs inverter;
one or more counters.

5. The power station of claim 1, wherein
the offshore container is a 20 ft, 40 ft or 45 ft standard offshore container.

6. The power station of claim 1, comprising
at least two powerful wind turbines; and
at least 120 m$^2$ of photovoltaic two sided panels for a 40 ft offshore container, which is at least four times more than the container's square.

7. The power station of claim 1, wherein
the light reflecting mats under and next to the MASWES with photovoltaic two sided panels together allow receiving significantly more energy from solar radiation;
the story of arrays is supported by several multi-section bars with/without leveling jacks between arrays and the lowest container edge for arrays angle correcting by at least 0-30 degrees;
the MASWES is situated on the ground blocks or external powerful piles;
the client front side has at least one charging point or charging substation is moved out by a couple of inches through the sliding door at the work phase having typical outlets (connectors).

8. The power station of claim 1, wherein
recessed screw-piles are additionally used as carriers of low-potential heat-cold in the heat pump system to heat or to cool the station depending on the season and the current temperature conditions.

9. The power station of claim 1, wherein
an air conditioner that automatically switches on when the temperature is too high or too low than it is provided by the operating conditions of the individual equipment or the station as a whole.

10. The power station of claim 1, wherein
surfaces of the container are covered by the light reflecting material that altogether allow retracting sunlight and directing it into the reverse surface of photovoltaic two sided panels despite specific hours of daytime and a season of the year;
light reflecting mats prevent the ground from being destroyed during different electric vehicles' and tractors' traffic for charging from the station; and
the container's roof taken off covered by light reflecting material might be used as an addition to the light reflecting mats.

11. The power station of claim 1, wherein
The connection between arrays and housing is created in the hinge way with the possibility of free movement so all solar panels together might stay as the whole horizontal surface of arrays which is simultaneously moved on multi-section bars depending on time of year and solar radiation by an automatic/non automatic leveling jack and an actuator.

12. The power station of claim 1, further comprising
two types of arrays:
the multi-section bars with/without leveling jacks for the low story of arrays are situated between arrays and the lowest container edge; and
the multi-section bars with/without leveling jacks for the low story of arrays are situated between arrays and the ground; and
the arrays for photovoltaic two sided panels on the machine (electrical) part's roof are corrected by actuators so together the low story, the roof's story and the high story of arrays create the whole horizontal surface for solar cells that might be simultaneously directed depending on solar radiation.

13. The power station of claim 1, wherein
the frame structures of solar panels are decomposed by means of hinged mechanisms having extreme positions that prevent their further expansion, thus creating a flat plane for mounting the panels;
the frames are stacked on top of the container for the original position; and
frame structures of solar panels, in the unfolded state, rest on the surface of the earth or attached to the container, which provides the rigidity and stability.

14. The power station of claim 1, wherein
the photovoltaic module arrays are unfolded to four sides of the container in simultaneously envelope and book layout from store situation to working position;

additional photovoltaic module arrays are lain on the former places of wind turbines' towers (masts) on the machine (electrical) part's roof giving the whole horizontal surface.

15. The power station of claim 1, wherein
in the stowed position wind turbines with turned gondolas and blades, wind vanes taken off are horizontally oppositely situated in the upper part of the container;
after opening the shutters of the solar panels' arrays, the installations are sequentially raised to the minimum necessary degree for the deployment of the blades, wind vanes, bringing the gondolas and the blades into the working position; and
the hydraulic mechanism (the electric actuator) mounts vertically and extends the concealed towers or telescopic part of each mast to the working position, fixing each mast with ropes to the soil and the container without obstructing the access path to the client side of the station.

16. The power station of claim 1, wherein
the monolith towers or telescopic masts of powerful wind turbines are erected by a hydraulic mechanisms (an electric actuator); and
after the monolith towers or telescopic masts are vertically mounted they are fixed to the reinforced internal columns by multi-bolt connection creating altogether the rigid systematic construction between the ground, screw-piles, the reinforced grillage, the internal columns and the monolith towers or telescopic masts supported by the reinforced hull.

17. The power station of claim 1, wherein
in the normal operation of all systems, sliding doors are opened from the client-side of the container, blocks of connectors and the payment terminals as charging points (groups of sockets) are pushed forward to reach the outside, fixed to the housing.

18. The power station of claim 1, further comprising
a station control and service center communication modules,
an antenna,
a computer,
weather, temperature, fluctuation, and safety sensors,
a fire alarm, a fire extinguisher,
video surveillance,
a lightning protection device wherein screw-piles are used as the ground rods; and
a wireless network where electronic equipment can be monitored and managed distantly through a safe channel of communication.

19. The power station of claim 18, further comprising
generation and charge management software that monitors the state of charge on batteries and their power sources—the solar power plant on photovoltaic two-sided panels and the powerful wind power plant, as well as;
software for predicting optimal operating modes, which has two regimes of operation—fully autonomous (single) and as a part of a group of power stations (workgroup).

20. The power station of claim 19, wherein
data on generation and charge management, forecasting of optimal operating modes are continuously transmitted to the computer cluster center; with
the software of the computer cluster center contains an artificial intelligence system based on multilayer neural networks, which is trained on a series of model situations, and then additionally learns on real data from MASWES;
wherein the application programming interface (API) for the computer cluster center provides an opportunity to conduct monitoring on the status of connectors/outlets of charging points of the station for the availability of connectors/outlets and the balance of energy produced and left at this station at any time.

* * * * *